US009367942B2

(12) United States Patent
Bares et al.

(10) Patent No.: US 9,367,942 B2
(45) Date of Patent: Jun. 14, 2016

(54) METHOD, SYSTEM AND SOFTWARE PROGRAM FOR SHOOTING AND EDITING A FILM COMPRISING AT LEAST ONE IMAGE OF A 3D COMPUTER-GENERATED ANIMATION

(71) Applicants: INRIA INSTITUT NATIONAL DE RECHERCHE EN INFORMATIQUE ET EN AUTOMATIQUE, Le Chesnay (FR); UNIVERSITE DE NANTES, Nantes (FR); Universita' degli Studi di Udine, Udine (IT); Thinking Lens, LLC, Jackson, MS (US); CENTRE NATIONAL DE LA RECHERCHE SCIENTIFIQUE (C.N.R.S.), Paris (FR)

(72) Inventors: William Bares, Jackson, MS (US); Christophe Lina, Rennes (FR); Marc Christie, Servon sur Vilaine (FR); Roberto Ranon, Udine (IT)

(73) Assignees: INRIA INSTITUT NATIONAL DE RECHERCHE EN INFORMATIQUE ET EN AUTOMATIQUE, Le Chesnay (FR); UNIVERSITE DE NANTES, Nantes (FR); UNIVERSITA DEGLI STUDI DI UDINE, Udine (IT); THINKING LENS, LLC, Jackson, MS (US); CENTRE NATIONAL DE LA RECHERCHE SCIENTIFIQUE (C.N.R.S.), Paris (FR)

( * ) Notice: Subject to any disclaimer, the term of this patent is extended or adjusted under 35 U.S.C. 154(b) by 569 days.

(21) Appl. No.: 13/688,844

(22) Filed: Nov. 29, 2012

(65) Prior Publication Data
US 2013/0135315 A1     May 30, 2013

(30) Foreign Application Priority Data
Nov. 29, 2011    (EP) ..................................... 11306582

(51) Int. Cl.
*G06T 13/20*      (2011.01)
*G06T 15/20*      (2011.01)
(Continued)

(52) U.S. Cl.
CPC .................. *G06T 13/20* (2013.01); *G06T 15/20* (2013.01); *G06T 19/00* (2013.01); *G11B 27/031* (2013.01); *G11B 27/34* (2013.01)

(58) Field of Classification Search
CPC .................... G06F 17/30749; G06F 17/30775; G06F 2203/04805; G06F 2203/04806; G06F 3/0481; G06F 17/30752; G06F 5/00; G06F 15/20; G06F 19/00; G06F 7/0018; G06F 7/0042
See application file for complete search history.

(56) References Cited

U.S. PATENT DOCUMENTS 6,040,841 A     3/2000   Cohen
6,331,861 B1   12/2001   Gever
(Continued)

OTHER PUBLICATIONS

Arijon. "Grammar of the Film Language" Silman-James Press 1976, pp. 1-89.
(Continued)

*Primary Examiner* — Maurice L McDowell, Jr.
*Assistant Examiner* — Raffi Isanians
(74) *Attorney, Agent, or Firm* — Troutman Sanders LLP

(57) ABSTRACT

Method for shooting and editing a film comprising at least one image of a 3D computer-generated animation created by a cinematographic software according to mathematical model of elements that are part of the animation and according to a definition of situations and actions occurring for said elements as a function of time, said method being characterized by comprising the following: computing of alternative suggested viewpoints by the cinematographic software for an image of the 3D computer-generated animation corresponding to a particular time point according to said definition; and instructing for displaying on a display interface, all together, images corresponding to said computed alternative suggested viewpoints of the 3D computer-generated animation at that particular time point.

38 Claims, 4 Drawing Sheets

Figure 1:
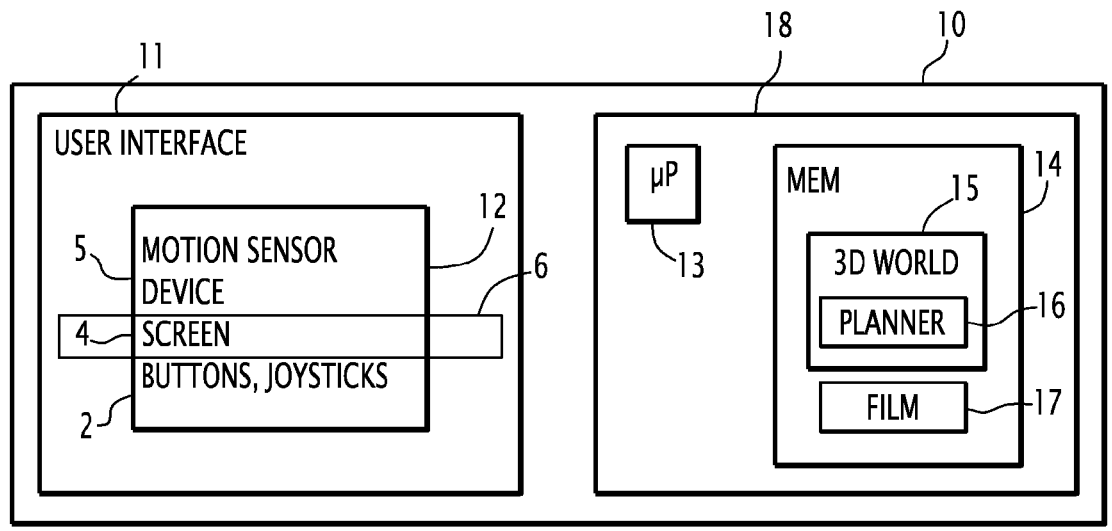

(51) Int. Cl.
G06T 19/00 (2011.01)
G11B 27/031 (2006.01)
G11B 27/34 (2006.01)

(56) References Cited

U.S. PATENT DOCUMENTS

2004/0104935 A1* 6/2004 Williamson et al. .......... 345/757
2010/0315415 A1* 12/2010 Asami .......................... 345/419

OTHER PUBLICATIONS

Bares, et al. "Virtual 3D Camera Composition from Frame Constraints" in Proceedings of the ACM international Conference on Multimedia (Multimedia 2000), ACM Press, pp. 177-186.
Bares "A Photographic Composition Assistant for Intelligent Virtual 3D Camera Systems" Smart Graphics 2006: pp. 172-183.
Blinn. "Where am I? What Am I Looking At?" IEEE Computer Graphics & Applications 1988, 8(4):76-81.
Burelli, et al. "Virtual Camera Composition with Particle Swarm Optimization" Smart Graphics 2008: pp. 130-141.
Drucker, et al. "CamDroid: A System for Implementing Intelligent Camera Control" Proceedings of the 1995 symposium on Interactive 3D graphics. p. 139-144.
Lino, et al. "A Real-time Cinematography System for Interactive 3D Environments" Eurographics/ACM SIGGRAPH Symposium on Computer Animation 2010.
Olivier, et al. "Visual Composition as Optimisation" AISB Symposium on AI and Creativity in Entertainment and Visual 1999.
Li-Wei He et al, "The virtual cinematographer: A Paradigm for Automatic Real-Time Camera Control and Directing", Computer Graphics Proceedings 1996 (SIGGRAPH). New Orleans, Aug. 4-9, 1996; [Computer Graphics Proceedings (SIGGRAPH)], New York, NY: ACM, US, Aug. 4, 1996, pp. 217-224, XP000682738.
Christie; Normand: "A semantic space partitioning approach to virtual camera control", Proceedings of the Eurographics Conference (EG 2005), Computer Graphics Forum, vol. 24, 2005, pp. 247-256, XP002676207.
Passos E B et al: "Neuronal editor agent for scene cutting in game cinematography", Computers in Entertainment 20091201 Association for Computing Machinery USA, vol. 7, No. 4, Dec. 1, 2009, XP002676208, DOI: DOI:10.1145/1658866.1658876.
Anonymous: "Autodesk Whitepaper: The New Art of Virtual Moviemaking", Autodesk, 2009, XP002676209, Retrieved from the internet: URL: http://images.autodesk.com/adsk/files/the_new_art_of_virtual_moviemaking_-_autodesk_whitepaper.pdf [retrieved on May 16, 2012].
Extended European Search Report dated Jun. 11, 2012, which issued during the prosecution of European Patent Application No. 11306582.5.

* cited by examiner

METHOD, SYSTEM AND SOFTWARE PROGRAM FOR SHOOTING AND EDITING A FILM COMPRISING AT LEAST ONE IMAGE OF A 3D COMPUTER-GENERATED ANIMATION

FIELD OF THE INVENTION

The invention relates to a method for shooting and editing a film comprising at least one image of a 3D computer-generated animation created by a cinematographic software according to mathematical model of elements that are part of the animation and according to a definition of situations and actions occurring for said elements as a function of time.

BACKGROUND

Despite numerous advances in tools to assist the creation of cinematography, it remains a time-consuming and largely manual endeavour requiring knowledge of established film-making conventions as well as creativity in knowing how to communicate a visual message using a camera. A cinematographer must consider the appropriate positioning, aiming, lens choice, movement of the camera and edits to visually communicate a story entailing compliance with conventions in screen composition, viewpoint selection and continuity rules. Such conventions guide the way successive viewpoints need to be arranged in time to effectively present a sequence of images.

These same issues must be addressed when producing cinematography in computer-generated virtual worlds by positioning and aiming a mathematical model of a virtual camera. Attempts to simplify the production of cinematography, especially for novices, include embedding composition guides into physical hand-held digital cameras, automated virtual camera planners, and physical devices equipped with motion sensors. However, each of these existing methods leaves much room for improvement.

Digital camera composition guides: Some consumer-level hand-held digital cameras include limited facilities to assist a user in composing a photograph as he or she peers through the viewfinder. Features include detecting faces and automatically adjusting focal depth so that the faces appear in sharp focus, pre-defined camera settings optimized for various common shooting scenarios such as night time, and grid lines to assist in aligning subjects within the frame. These solutions only assist in composing one single image as currently seen through the viewfinder and deal with only the most rudimentary composition guidelines.

Automated virtual camera planners: The research field of automated virtual camera planning, which combines expertise in Computer Graphics and Artificial Intelligence, has resulted in increasingly sophisticated algorithms to emulate the composition and editing decisions found in traditional films. Early efforts in automated camera control employed hand-coded camera locations relative to the subject(s) being viewed while attempts to model the editing process have relied on idiom-based approaches using hierarchical state machines to model and transition between commonly used shot types [Li-Wei He et al. 1996]. Existing implementations of the idiom-based approach require extensive human effort to design finite state machines to encode the shot selection and transition logic needed to film a given anticipated type of scenario such as groups of two or three characters conversing. Heuristic search-based or optimization techniques repeatedly generate and evaluate the quality of candidate viewpoints until a satisfactory one is found [for example Drucker and Zeltzer 1995—"CamDroid: A System for Implementing Intelligent Camera Control," in Proc of the 1995 Symp. on Interactive 3D Graphics, pp. 139-144, 1995]. This approach is generally effective in producing acceptable cinematography when characters vary somewhat in their position, orientation, or size. However, if a filmmaker wishes for the system to produce a specific viewpoint in a given situation, then he or she must adjust the parameters that govern the optimization such as changing evaluation scoring weights, the constraints, and/or initial values of the search. Once the optimization search begins, it is largely out of the user's control, until the solver reports its solution. Consequently, a user who is not intimately familiar with the inner workings of the optimizer could become frustrated trying to coax the optimizer to output the desired virtual camera composition. Even worse, these techniques have found little to no use in producing real-world cinematography primarily because they require specialized expertise to implement and operate, and their results, which are often excellent in mimicking anticipated sequences of textbook cinematography, fail to produce the type of creative results demanded by expert human filmmakers. In attempting to minimize the burden of human input to manually control a virtual camera, these methods have consequently neglected to consider novel ways of incorporating creative human input into the automated camera planning process.

Motion-sensing virtual cameras: Some movie production and virtual reality companies have developed motion-tracked virtual camera devices (FIG. 3) that couple camera-like bodies or camera mounts, preview monitors, and usually buttons and joysticks with 3DOF (orientation) or 6DOF (position and orientation) motion sensors and software plug-ins that map device inputs to virtual camera parameters in high-end animation packages (e.g. Autodesk's MotionBuilder, 3DS Max, or Maya). With a 6DOF (position and orientation) sensing system, a camera operator can simply walk about and point the virtual camera device in the most intuitive and familiar way possible, which in turn produces correspondingly similar moves of the virtual camera. These solutions have in effect replaced the mouse and keyboard with a more intuitive input device, but they have not considered how the user interface and workflow of the accompanying computer-generated (CG) animation software may be enhanced to more fully take advantage of these motion-sensing inputs. These solutions do not allow a user to easily create, organize, and consider side-by-side alternative ways to film a given sequence of events. Their users must still expend considerable time and energy moving and turning within a volume (sometimes up to 40×40 feet or larger) of real-world space to explore alternate viewpoints.

U.S. Pat. No. 6,040,841 discloses a virtual cinematographer.

Thus there is a need to provide for an easier and richer method for creating and editing camera views and movements which dynamically integrates creative human input into automated virtual cinematography tools.

SUMMARY

According to a first aspect, the invention proposes a computer-implemented method for computing and proposing one or more virtual camera viewpoints comprising:
 computing virtual camera viewpoints of a given set of three-dimensional subjects corresponding to a common time point where said computation is a function of at least one visual composition property of at least one previously recorded virtual camera viewpoint,
 presenting said computed virtual camera viewpoints, detecting a selection of at least one of said presented virtual camera viewpoints, and recording of said selected virtual camera viewpoint.

The method according to the invention includes in some embodiments one or several following features:

it comprises a step of using said recorded virtual camera viewpoint for a shot of images from said common time point;

an image of animation is determined as a function of projecting onto a two-dimensional image, the geometric representation of said three-dimensional subject(s) as viewed from a given virtual camera viewpoint;

a virtual camera viewpoint is described by any one or more of the following properties: position of a virtual camera relative to a coordinate system, the orientation of a virtual camera relative to a coordinate system, field of view angle of a virtual camera lens, or focal depth of a virtual camera lens;

it comprises a step of evaluating or ranking the quality of said candidate viewpoints as a function of at least one visual composition property of at least one previously recorded viewpoint;

ranking said candidate viewpoints uses a function of the continuity with respect to least one visual composition property of the image corresponding to a candidate viewpoint versus the image corresponding to at least one previously recorded virtual camera viewpoint;

a visual composition property is determined as a function of at least one dimension of at least one of said subjects in the image;

a visual composition property includes location of at least one of said subjects in the image;

a visual composition property includes relative angle between the virtual camera and at least one of said subjects or direction of motion of at least one of the said subjects or direction in which the at least one of the subjects faces;

a visual composition property includes on which side of the line of interest the virtual camera is positioned;

a visual composition property includes the apparent overlapping or occlusion of the one subject over another subject;

it comprises the detection of a selection by a user of one or more desired visual composition properties that are to be used in the step of ranking candidate viewpoints;

the step of ranking candidate viewpoints according to continuity of at least one visual composition property comprises determining whether or not a candidate viewpoint maintains similar appearance of said property with respect to at least one previously recorded virtual camera viewpoint, and wherein maintaining a similar appearance corresponds to a higher quality of said candidate viewpoint;

maintaining similar appearance comprises that the candidate viewpoint lies on the same side of the line of interest as said previously recorded viewpoint;

maintaining similar appearance comprises that the candidate viewpoint's shot size is within one canonical unit of its shot size from said previously recorded viewpoint;

maintaining similar appearance comprises that the difference in viewpoint orientation relative to at least one subject or direction of motion of at least one subject or direction in which the at least one subject faces in a candidate viewpoint versus said previously recorded viewpoint is less than a given threshold;

the given threshold for the difference in orientation with relation to the subject is 30 degrees;

maintaining similar appearance comprises that the distance between the center of a subject as seen in the image corresponding to a candidate viewpoint is less than a specified desired threshold versus the center of the same subject as seen in the image corresponding to said previously recorded viewpoint;

maintaining similar appearance comprises at least one of the following conditions:

that the center of an subject as seen in the image corresponding to a candidate viewpoint and the center of the same subject as seen in the image corresponding to said previously recorded viewpoint project to the same relative side of a specified line of reference;

if an subject as seen in the image corresponding to a candidate viewpoint and the same subject as seen in the image corresponding to said previously recorded viewpoint are overlapped by the same other subject(s), and if the difference between said two images of the amount of overlapping is less than a given threshold;

if the difference between the amount of occlusion of an subject as seen in the image corresponding to a candidate viewpoint and of the same subject as seen in the image corresponding to said previously recorded viewpoint of the amount is less than a given threshold;

if an subject as seen in the image corresponding to a candidate viewpoint and the same subject as seen in the image corresponding to said previously recorded viewpoint are cropped or clipped by the same edge(s) of image;

if both the distance between a virtual camera position corresponding to a candidate viewpoint and the center of an subject as seen in the image corresponding to a candidate viewpoint and the distance between a virtual camera position corresponding to a candidate viewpoint and the center of the same subject as seen in the image corresponding to said previously recorded viewpoint lie less than a given number of units of the distance of sharpest focus;

if both the distance between a virtual camera position corresponding to a candidate viewpoint and the center of an subject as seen in the image corresponding to a candidate viewpoint and the distance between a virtual camera position corresponding to a candidate viewpoint and the center of the same subject as seen in the image corresponding to said previously recorded viewpoint lie more than a given number of units of the distance of sharpest focus;

if the sum of visual weight of all subjects is concentrated in the same region of the image for both the image corresponding to a candidate viewpoint and the image corresponding to a candidate viewpoint;

the step of ranking candidate viewpoints according to continuity of at least one visual composition property comprises determining whether or not a candidate viewpoint is distinct in appearance in terms of said property with respect to at least one previously recorded virtual camera viewpoint; and wherein being distinct in appearance corresponds to a higher quality of said candidate viewpoint;

being distinct in appearance comprises that the candidate viewpoint's shot size differs by two or more canonical units from said previously recorded viewpoint;

being distinct in appearance comprises that the difference in viewpoint orientation relative to at least one subject or direction of motion of at least one subject or direction in which the at least one subject faces in a candidate viewpoint versus said previously recorded viewpoint is more than a given threshold;

said given threshold for the difference of orientation with relation to the subject is 30 degrees;

it comprises a step of detecting the specification by a user of whether continuity of at least one visual composition property maintains similar appearance or is to be distinct in appearance with respect to at least one previously recorded virtual camera viewpoint;

the step of ranking said candidate viewpoints uses a function of knowledge of previously observed transitions between two or more previously-recorded virtual camera viewpoints where said knowledge of previously observed transitions is organized according to at least one visual composition property;

a previously recorded virtual camera viewpoint is a member of a canonical shot type;

a canonical shot type includes one or more virtual camera viewpoints that share the same canonical angle as defined as being any one of internal, apex, external, parallel, subjective, front, left, and rear;

a canonical shot type includes one or more virtual camera viewpoints that share the same canonical distance as defined as being any one of extreme close-up, close-up, medium, long, and extreme long;

a canonical shot type is defined comprising a semantic volume that demarcates a region of space that may contain one or more virtual camera viewpoints;

a count is maintained of the number of observed transitions between a specific preceding canonical shot type and a specific succeeding canonical shot type;

the count is stored using a two-dimensional matrix having rows and columns corresponding to canonical shot types;

the quality ranking for a candidate viewpoint in canonical shot type comprises assigning a rank proportionate to the count corresponding to the number of observed transitions from the canonical shot type of the previously recorded viewpoint to canonical shot type of the candidate viewpoint;

the knowledge of observed transitions may distinguish between transitions that occur in contexts of at least any one or more of the same action being depicted in the two shots of a transition, related actions being depicted in the two shots of a transition, or unrelated actions being depicted in the two shots of a transition;

a separate transition matrix is maintained for each of said contexts;

proposed virtual camera viewpoints are presented as being arranged by at least one visual arranging property;

proposed virtual camera viewpoints are arranged as a row of images corresponding to each proposed virtual camera viewpoint;

proposed virtual camera viewpoints are arranged as a stack of images corresponding to each proposed virtual camera viewpoint;

proposed virtual camera viewpoints are arranged as a function of the relative spatial location of the virtual camera positions relative to the one or more subjects;

a visual arranging property comprises a function of the height of at least one of said subjects in the image;

a visual arranging property comprises relative angle between the virtual camera and at least one of said subjects;

a visual arranging property comprises on which side of the line of interest the virtual camera is positioned;

a visual arranging property includes the canonical distances of at least one or more of extreme close-up, close-up, medium, long, and extreme long;

a visual arranging property includes the canonical angles of at least one or more of internal, apex, external, parallel, subjective, front, left, and rear;

tracked motion of position or orientation result in corresponding browsal through the set of displayed viewpoints;

a forward motion is interpreted as a request to browse to reveal viewpoints that have canonical shot distances closer to the subject;

one of said presented virtual camera viewpoints is selected through a of user input;

a means of user input comprises a user touching an on-screen image corresponding to the presented virtual camera viewpoint to be selected;

the method further comprises detection of a manual control of a virtual camera and detection of a change of at least one of said properties of said selected virtual camera viewpoint according to said manually control detected of a virtual camera, the recorded virtual camera viewpoint corresponding to the selected virtual camera viewpoint modified according to said detected change;

manually changed properties of said selected virtual camera viewpoint include at least one of position of a virtual camera relative to a coordinate system, the orientation of a virtual camera relative to a coordinate system, field of view angle of a virtual camera lens, or focal depth of a virtual camera lens;

upon following the detection of the manual control of said selected virtual camera viewpoint, the user-controlled virtual camera is initialized to correspond to said selected virtual camera viewpoint;

said manual control uses a motion-sensing input device detecting a motion and generating a corresponding control signal that in turn produces a corresponding change to at least one property of said selected virtual camera viewpoint;

said manual control uses a physically-actuated input device such as a keyboard, mouse, buttons, or joystick;

said selected virtual camera viewpoint is recorded to some form of computer-readable storage;

recording comprises storing a record of said virtual camera viewpoint in the form of the virtual camera properties corresponding to said virtual camera viewpoint;

recording comprises storing a representation of the image corresponding to said virtual camera viewpoint;

recording comprises updating the function of knowledge of observed transitions between two successively selected virtual camera viewpoints as a function of the observed transition between the most recent previously-recorded virtual camera viewpoint and said currently selected and reviewed virtual camera viewpoint;

a record is made of the observation of a transition in which the canonical shot type of said selected virtual camera viewpoint follows the canonical shot type of the previously recorded virtual camera viewpoint;

the transition matrix element determined by the row and column corresponding to said pair of canonical shot types of said transition is updated to reflect an observed occurrence of said transition.

According to another aspect, the invention proposes a computer-readable storage medium having stored therein instructions capable of causing a computer to perform the method according to the first aspect of the invention.

According to another aspect, the invention proposes a method for shooting and editing a film as defined above, comprising the following steps:
- computing of alternative suggested viewpoints by the cinematographic software for an image of the 3D computer-generated animation corresponding to a particular time point according to said definition;
- instructing for displaying on a display interface, all together, images corresponding to said computed alternative suggested viewpoints of the 3D computer-generated animation at that particular time point.

According to the invention, an intelligent automated virtual cinematography planner computes one or more alternative viewpoints that represent visually distinct angles, shot distances, compositions, and style, among other properties) that could be used to view or film given object(s) or action(s) occurring at a selected moment or interval of time in a computer-generated virtual environment.

In some embodiments, the method according to the invention includes one or several following features:
- upon selection by a user of one of the said displayed computed alternative suggested viewpoints the cinematographic module is adapted for, recording the selected viewpoint as the viewpoint to be used for a shot of image(s) of the film from said particular time point;
- a viewpoint is defined as specific position and/or orientation and/or lens properties of a virtual camera defined in the cinematographic software by a mathematical model and used by the cinematographic software to film the 3D computer-generated animation;
- further to a selection by a user of one of the said displayed computed alternative suggested viewpoints and to data provided by the user defining a viewpoint change, computing of a modified suggested viewpoint based on the selected viewpoints as changed according to the viewpoint and instructing for displaying the image corresponding to said modified viewpoint on the display interface;
- further comprising the step of recording the modified viewpoint as the viewpoint to be used for at least one image of the film corresponding to said particular time point;
- comprising the step of configuring as a function of the selected viewpoint, an input device including a motion sensor set and representing a virtual camera filming the 3D computer-generated animation, the viewpoint change being defined by the user by operating the input device and, wherein the change in position, respectively orientation, of the device operated by the user is computed as a corresponding change of the viewpoint of the 3D computer-generated animation at the particular time point and obtained with such a camera;
- alternative suggested viewpoints are computed by the cinematographic software as a function of at least one of the following items i/ to v/, and/or wherein said display instructions defining the organization on the display interface of images corresponding to suggested viewpoints are determined as a function of at least one of the following items i/ to v/:
  - i/—at least one suggested viewpoint previously chosen by a user among several suggested viewpoints corresponding to another time point; and/or
  - ii/—at least a viewpoint created or modified according to a position, orientation and/or lens properties of a corresponding virtual camera provided by a user and corresponding to another time point; and/or
  - iii/—at least one visual composition property of an image; and/or
  - iv/—a maximum or minimum difference in at least a given property between images of successive viewpoints, said property being related to visual composition of an image; and/or
  - v/—computation of occurrence frequencies of transition between angle(s) and/or distance(s) of successive viewpoints;
- display instructions defining the organization on the display interface of images corresponding to viewpoints created by a user are also determined as a function of at least one of the items i/ to v/;
- the images corresponding to the said computed alternative suggested viewpoints of the 3D computer-generated animation at that particular time point are to be displayed on the display interface as partitioned into groups each corresponding to respective value range of at least one selected visual composition property;
- said visual composition property is related to at least one given element in an image and including one or several among appearance or absence of the element in the image, width of the element in the image, height of the element in the image, location of the element in the image, height of the element relative to another element in the image, location of the element relative to another element in the image, relative ground-plane angle between camera and element, elevation angle of camera relative to the element, camera roll or canted angle, distance between virtual camera and element, overlap of the element over another element, portion of the element(s) that is cropped by edge(s) of the image, which edge(s) of the image crop the element, direction as seen in-the-image in which the element faces or is moving, whether the element is in focus or out-of-focus, visual weight of the element, or overall distribution of visual weight; and/or
- imaging elements so that they lie along imaginary and equally-spaced horizontal or vertical lines that split the image onto thirds along both the horizontal and vertical directions; and/or
- keeping the virtual camera corresponding to successive viewpoints on the same side of an imaginary line corresponding to the direction in which an element is moving or facing or of an imaginary line that passes through two given elements;
- the step of determining a correspondence between a 3D real-world space and 3D virtual world animation according to sensed 3D real-world positions, and wherein, upon selection of a suggested viewpoint, a virtual camera volume is positioned and sized so that a given amount of a real-world motion corresponds to an appropriate distance of motion in the virtual world.

According to another aspect, the invention proposes a software program product to be installed in a system for shooting and editing a film comprising at least one image of a 3D computer-generated animation created by a cinematographic software according to mathematical model of elements that are part of the animation and according to definition of situations and actions occurring for said elements as a function of time, said Software Program product comprising software instructions to implement the steps of a method according the first aspect of the invention when the program is executed on processing means of said system.

According to another aspect, the invention proposes a system for shooting and editing a film, said system comprising a cinematographic module adapted for creating at least one image of a 3D computer-generated animation according to mathematical model of elements that are part of the animation and according to a definition of situations and actions occurring for said elements as a function of time,
wherein the cinematographic module is adapted for computing alternative suggested viewpoints for an image of the 3D computer-generated animation corresponding to a particular time point according to said definition;
and the cinematographic module is adapted for instructing the display on a display interface, all together, of images (corresponding to said computed alternative suggested viewpoints of the 3D computer-generated animation at that particular time point.

DESCRIPTIONS OF THE DRAWINGS

Figure 2:
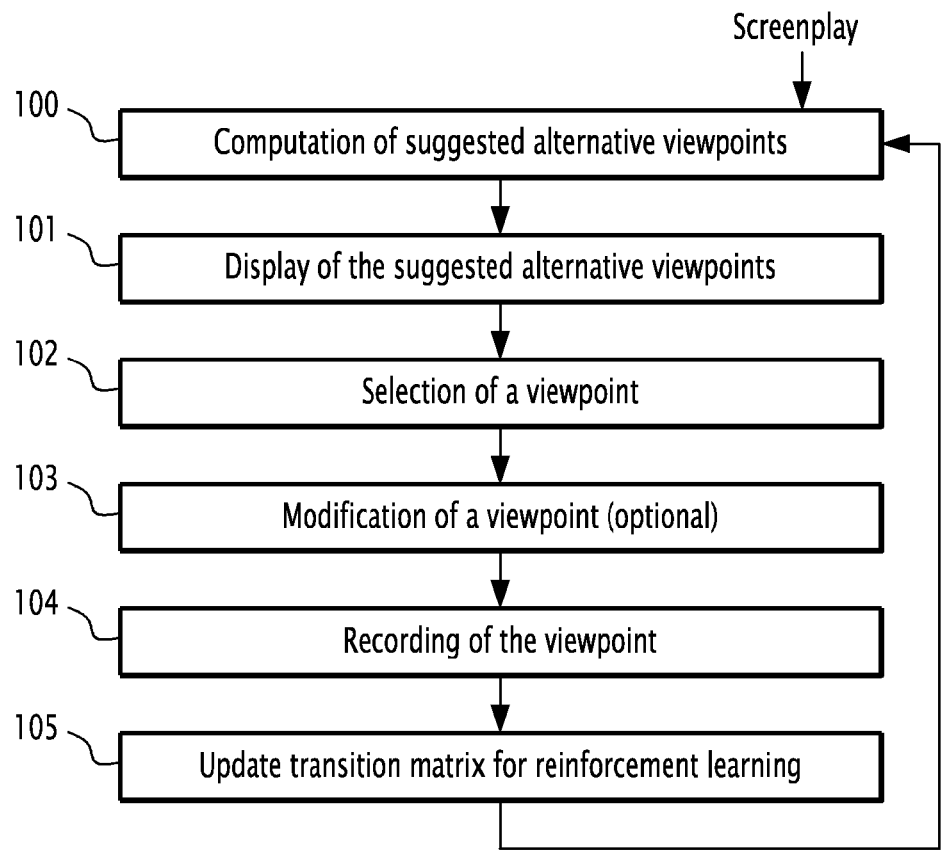
Figure 3:
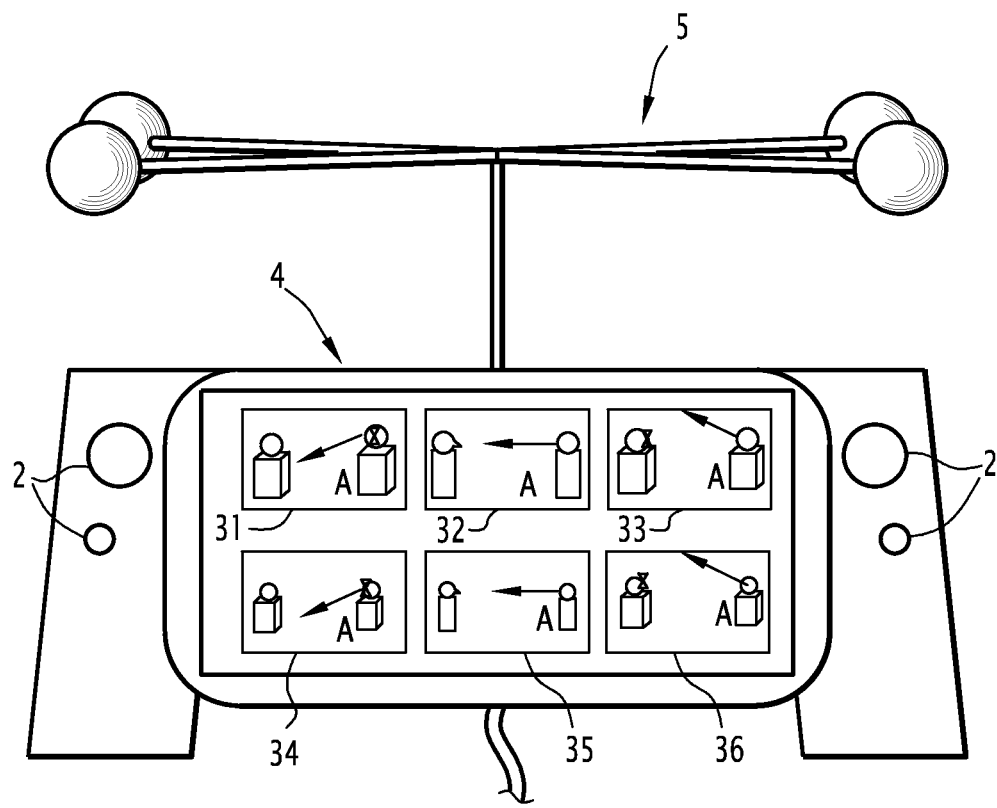
Figure 4:
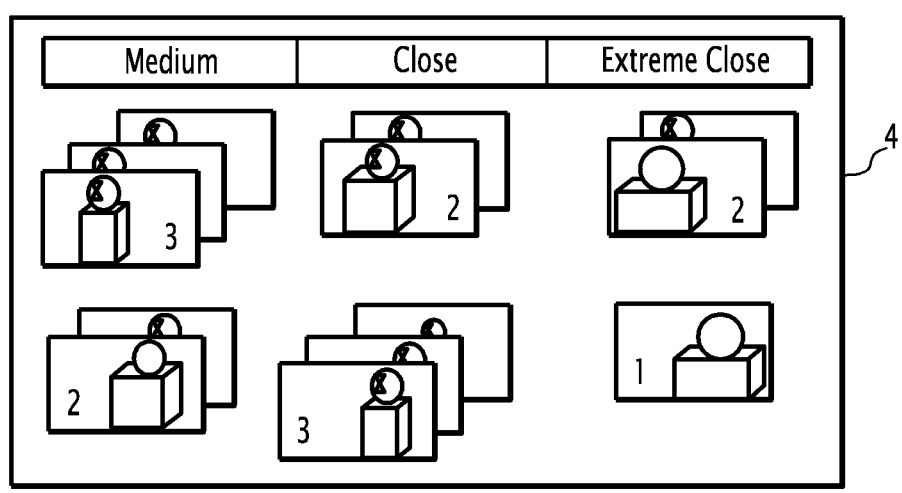
Figure 5:
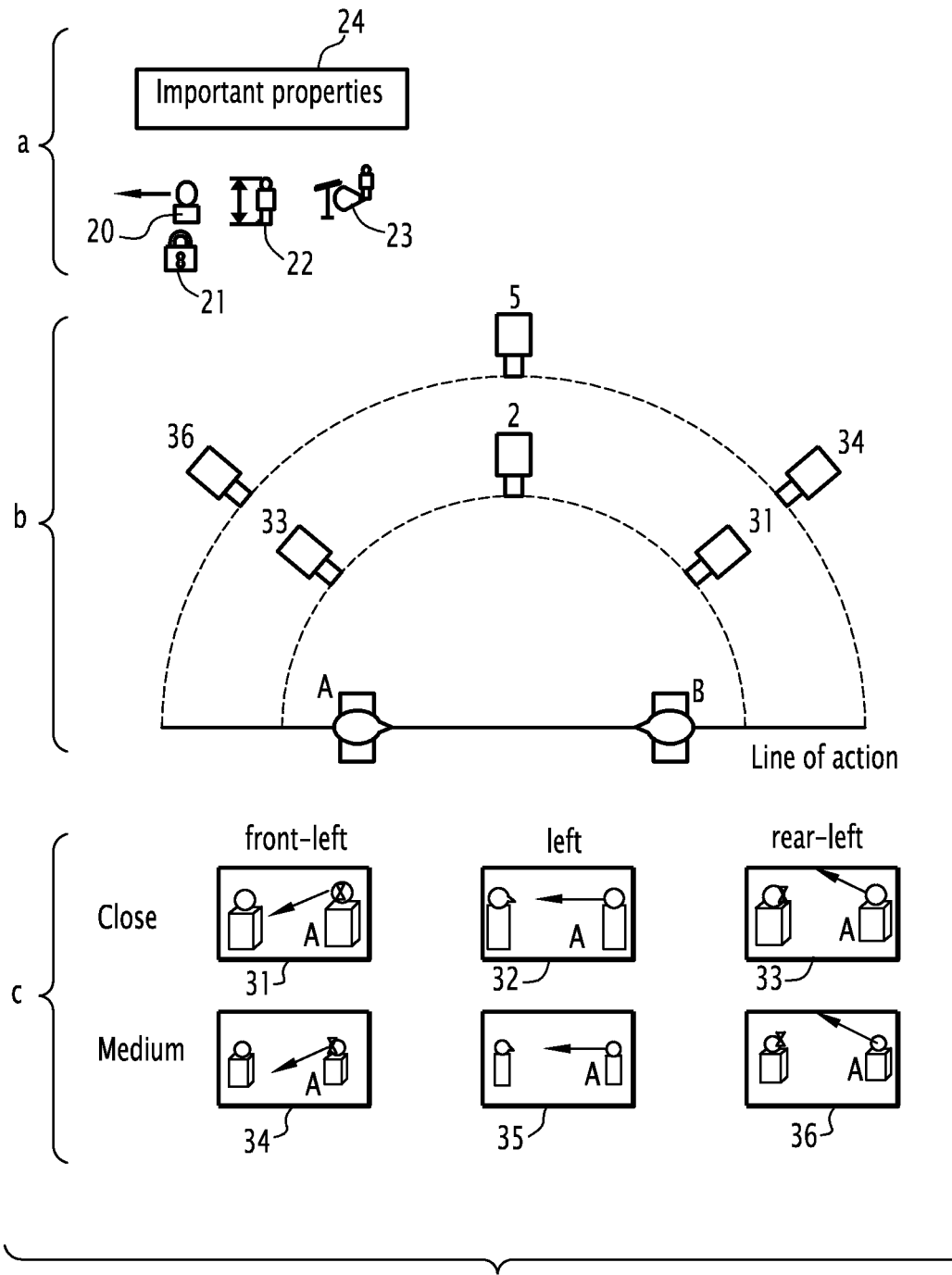
Figure 6:
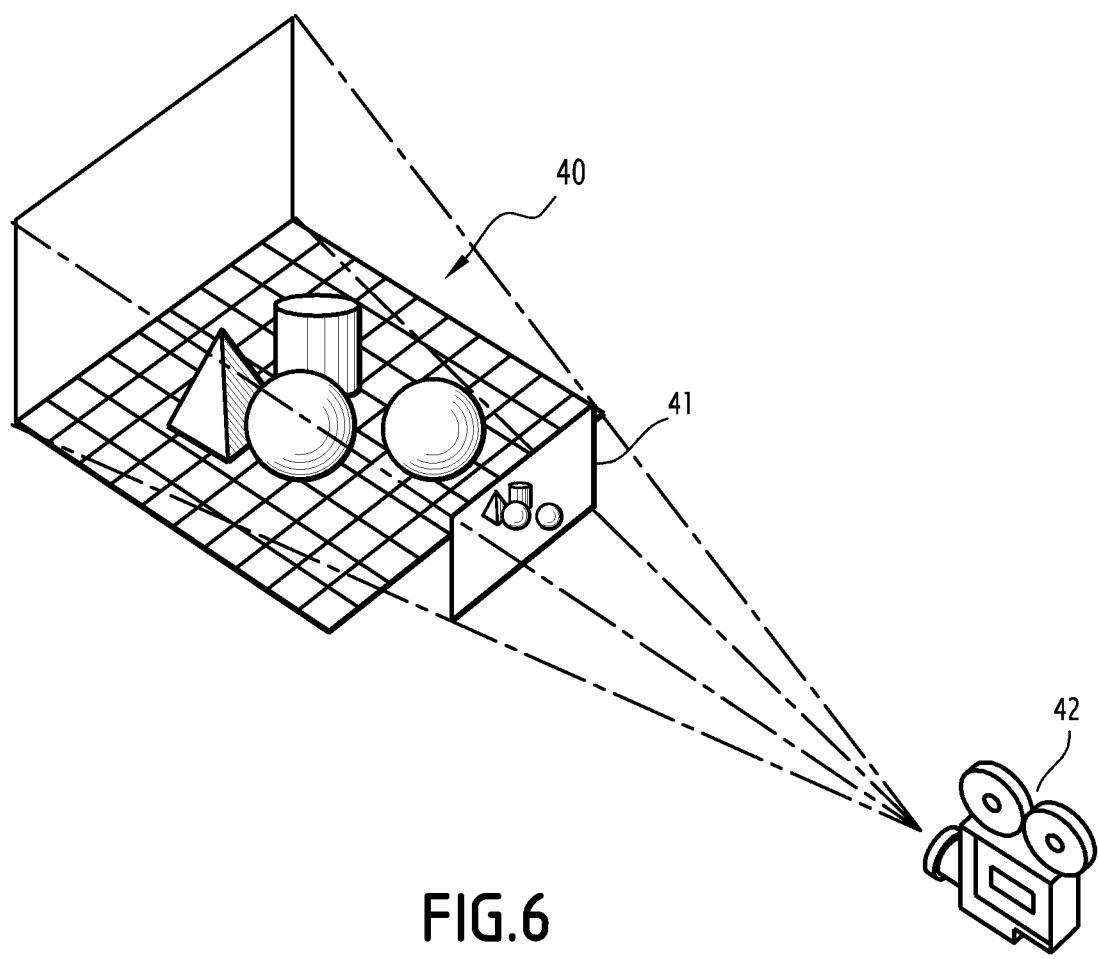

The present invention is illustrated by way of example, and not by way of limitation, in the figures of the accompanying drawings and in which like reference numerals refer to similar elements and in which:

FIG. 1 shows a schematic view of a system in an embodiment of the invention;

FIG. 2. shows steps of a method according to an embodiment the invention;

FIG. 3. shows an example of a virtual camera device;

FIG. 4. represents the display of alternative viewpoints in an embodiment of the invention;

FIG. 5 represents examples of suggested viewpoint;

FIG. 6. represents an image of a virtual 3D world by a virtual camera viewpoint.

DEFINITIONS OF TERMS

Aspect ratio—is the ratio of an image's width divided by its height. Standard North American television images have a 3-to-2 (also written as 3:2) aspect ratio.

Blocking—describes the relative location, orientation, and movement of characters or props on a theatre stage or movie set. For example, two actors stand three feet apart facing one another.

Bounding rectangle—is the smallest rectangle that completely encloses a given shape in a two-dimensional image. A bounding rectangle can be used as a rough approximation to the shape or size of a shape in the frame.

Bounding box—is a rectangular box that encloses a volume of three-dimensional space that tightly encloses a given three-dimensional object.

Canonical angles—Enumerated list of compositionally distinctive relative viewing angles between camera and subject or subjects including external, internal, parallel, apex, front, left, right, rear. A given canonical angle such as front can encompass a continuum of angles such that the measured angle between the character's forward direction and vector towards the camera is less than a given tolerance angle theta. Lists of canonical angles have been long established by cinematic convention (Grammar of the Film Language by Daniel Arijon, 1976).

Canonical distances—Enumerated list of compositionally distance relative distances between camera and subject or subjects. In established cinematic convention, distance relates to the height at which a subject appears in the frame and is determined by distance from camera to subject and lens field of view. Canonical distances include extreme close-up, close-up, medium, long, and extreme long (Grammar of the Film Language by Daniel Arijon, 1976).

Center of projection—is the point at which light rays converge onto the film or digital imager in a physical camera or the point at which rays of perspective projection converge in a virtual camera. The center of projection generally coincides with the position of a virtual camera.

Cinematography—the art of placing, aiming, moving a camera to record a subjects or events. Most conventions of cinematic practice and style apply to both real world physical cameras and virtual cameras that create images from 3D computer models of objects and animated actions.

Composition—the artful arrangement of elements in a picture frame. Composition considers properties such as the position of a subject in the frame, size of subject, angle between camera and subject, overlap of one subject over another, among others Composition encoding—a computerized representation of on-screen properties and/or semantic characterization of a viewpoint into one of several canonical angles including for example, internal, apex, external, parallel, subjective, front, left, rear, etc. and one of several canonical distances including for example extreme close-up, close up, medium, long, extreme long. The encoding of the on-screen composition properties of one or more subjects and/or the image taken as a whole. The encoding can be automatically computed by analyzing the geometric relationships between the subjects, virtual camera, and the projections of the 3D subjects onto the 2D projection plane. For example, the height of subject A fills half the frame height and subject A lies in the left half of the frame and the camera is to the front-right of subject A. Other properties include location in the frame, exact relative angle between camera and subject, and direction vector (dx, dy) a subject appears to gaze. The encoding can be computed by using approximations such as bounding rectangles of the projections of subjects into the frame or by pixel maps of the subjects. Alternately, an encoding can be created for a digital image or digital video clip by hand annotation or automatically computed by other means. Such an annotation would consider how the real physical film camera would have been placed and aimed relative to the subjects to produce the given digital image.

Computer-generated virtual world—is a mathematical model of shapes, lights, material properties, and virtual cameras that is encoded and processed by a computing device. The mathematical model of a virtual 3D world may be formulated to represent the series of locations and configurations of subjects that exist in the real or physical world as they optionally change in time.

Continuity—consideration of how visual composition properties remain constant or change over a time-sequenced series of viewpoints.

Coordinate system—A system which uses one or more numbers, or coordinates, to uniquely determine the spatial configuration (e.g. the position or orientation) of a point or other geometric element.

Cut—to instantly move a camera from one viewpoint to a different viewpoint without displaying any intermediate images.

Cut on action—cinematography guideline that recommends cutting to the next viewpoint when a subject begins an action so that the subject's movement draws the viewer's eye away from a potentially distracting change in viewpoint.

Cutting rate—The number of cuts per unit time, also known as pace.

Crossing the line—occurs when the camera is moved from one side of the line of action or line of interest to the other. A cut between two viewpoints that crosses the line may result in confusing the viewer as a subject suddenly appears to reverse facing direction.

Digital image—image represented by machine-readable digital encoding usually as a two-dimensional grid of pixels (picture elements). The image may be created from any possible source or means from scanning a paper sketch, digital camera photo, or rendered in 3d, etc.

Field of view angle—the angular span of visible area swept out by an imaginary pyramid whose apex (peak) is at the center of projection of a virtual camera.

Focal depth—the depth or distance in front of a camera lens at which objects at that distance appear in sharpest focus as imaged by a given lens.

Frame—one image in an animation or motion picture as rendered from a virtual or real-world physical camera. In the context of this invention frame is interchangeable with digital image.

Gaze—the direction in which a character or object appears to be facing in the frame.

Indexed viewpoint—is a viewpoint that is combined with the composition encoding of its corresponding virtual camera.

Line of action (LOA)—an imaginary line corresponding to the direction in which a single virtual character is moving or facing.

Line of interest (LPO)—an imaginary line that passes through two given subjects.

Local storage—computer-readable storage medium that is physically attached or part of a computing device or physical picture-taking device being operated by a user.

Motion sensor—device capable of detecting and reporting physical motions of change in position and/or orientation of either the sensor device itself or of a body, body part, marker, or other prop which the sensor can detect. In computer graphics terminology, a three-degree of freedom (3DOF) sensor may for example detect a 3d position or a 3d orientation while a six-degree of freedom (6DOF) sensor may detect both a 3d position and a 3d orientation.

Narrative event—an event that occurs at a specific instant of time or interval of time in the course of an animation, usually an animation that tells a story involving characters, dialog, and actions. An event usually involves one or more characters or objects that participate in the event.

Narrative planner—an automated software system that computes the narrative events that comprise a story. These planners represent an advanced sub-field of Artificial Intelligence.

Networked storage—computer-readable storage medium that is located apart from the computing or picture-taking device being operated by a user. The storage is accessed via a wired or wireless network connection. The networked storage may be private and reserved for use only by an allowed set of user(s) or the storage may be public allowing anyone to access it.

Normalized frame coordinates—A two-dimensional coordinate system used to define points and vectors in a frame in which the center of the frame is the origin (0, 0), bottom-left is (−1,−1), and top-right is (+1, +1). Normalized coordinates are used in computing composition encodings and formulating desired visual composition properties since they enable the computations to be done independent of the frame aspect ratio.

Occlusion—occurs when one object is partially or completely hidden behind another object.

Orientation—the directional angles relative to each of the three axes of an orthogonal coordinate system whose origin is the center of projection of the camera, and the direction vectors of axes correspond to "up", "front" and "right" vectors of the camera. Orientation is often expressed as three angles: yaw, pitch, and roll. Orientation may also be expressed in matrix or quaternion form.

Orthogonal coordinate system—is a coordinate system which uses orthogonal axes where each axis is perpendicular to each of the other axes. For instance a 3d Cartesian coordinate system uses three orthogonal axes.

Perspective projection—a type of projection in which a three-dimensional point P is projected onto a two-dimensional image by tracing a line from P to the virtual camera's center of projection. A perspective projection has the effect of causing objects that are farther from the center of projection to appear smaller.

Photographed image—is an image that was produced by a real-world physical film camera, movie camera, digital camera, or digital movie camera.

Physical camera—is a real-world still or motion-picture recording device (as opposed to a virtual camera).

Pixel—a single discrete dot having a given color in a digitized representation of an image Pixel map—is a rectangular grid of monochrome or colored dots (or pixels) that can be used to represent a digital image.

Position—a location in space defined by a point (x,y,z) whose three components are measured with respect to a known coordinate system, origin, and units of measure. Position may refer to a location in a virtual 3D world or in a real-world.

Projection—the process of forming a two-dimensional image of a three-dim ensional point or object.

Rendering—the process by which a three-dimensional model of a virtual world is processed from a given viewpoint to produce a two-dimensional image.

Rendered image—an image created by rendering a virtual world as seen from a given virtual camera.

Rule of Thirds—photographic or cinematic convention that recommends framing subjects so that they lie along imaginary and equally-spaced horizontal or vertical lines that split the frame into thirds along both the horizontal and vertical directions.

Screenplay—an information source that defines a sequence of narrative events usually of a story to be visualized by real-world or virtual cameras. For the purpose of this invention, the information in a screenplay provides the system with advance knowledge of narrative events and allows the system to repeatedly replay animation to facilitate exploration of alternative viewpoints for filming the given animation. The content of the screenplay may be edited or computed by any number of methods, including, but not limited to the following: The screenplay may be hand-coded by a human and stored in machine-readable form, edited with the aid of a graphical interface tool, automatically computed by a narrative planner, derived from saved logs of narrative events that may have been created through logging live video game play, motion-capture sessions, live training simulations, or any other means of creating or playing out 3d computer animation.

Sequence of indexed viewpoints—Two or more indexed viewpoints that are intended to be displayed one after another in the order listed.

Shot—a series of images produced by filming without interruption between pressing the record button and subsequently pressing the stop recording button on a film camera or a virtual camera. A shot may keep the virtual camera fixed through its duration or vary one or more parameters of the camera over its duration.

SMPTE time code—Industry-standard notation used to precisely identify a moment of time in film or animation. The notation is given as hours:minutes:seconds:frames, where each is a non-negative integer giving the number of hours, minutes, seconds, and frames with frames being counted up to a fixed frame rate such as 24 frames per second or 30 frames per second, etc. The acronym SMPTE stands for Society of Motion Picture and Television Engineers.

Subject—A single object, single character, part of a single object (e.g. roof of a house), or part of a single character (e.g. head) or any group of any combination of one or more of the aforementioned entities upon which the viewer wishes to focus his or her attention. In general for a given instant in time of an animated story, the screenplay determines the subject or subjects.

Temporal property—the moment or interval of time at which a viewpoint or sequence of viewpoints occurs in time or by specified narrative event.

Transition—a change from displaying one viewpoint to displaying a second viewpoint. A transition may be a continuous movement of the camera from one viewpoint to the next or an instantaneous cut to the next viewpoint.

Transition matrix—A rectangular grid of rows (R1-RM) and columns (C1-CN) of cells Cik with i=1 to M and k=1 to N, in which the rows correspond to a previous canonical angle and canonical distance and the columns correspond to a succeeding canonical angle and canonical distance. The content of each cell Cik, i=1 to M, k=1 to N may indicate whether or not it is possible to transition or move from the canonical angle and canonical distance represented by row Ri to the canonical angle and canonical distance represented by column Ck, k=1 to N. The content of each cell Cik may also be expressed as a probability of making a move from one canonical angle and canonical distance represented by row Ri to another canonical angle and canonical distance represented by column Ck. In such case, the transition matrix is a stochastic matrix used to describe the transitions of a Markov chain. This transition matrix is encoded as a right stochastic matrix, i.e a square matrix where each row consists of nonnegative real numbers summing to 1. Cells may also count the number of observed instances out of total observations in which a given Ri to Ck transition occurs.

Transparency—an effect in which it is possible to see through an object or image. The degree of transparency may vary between completely opaque to fully transparent.

Vector—specifies a direction and length expressed as three real values measured along the X, Y, and Z coordinate axes.

Viewpoint—a given assignment of values to all parameters that uniquely define a virtual camera. A virtual camera viewpoint applied to a virtual 3D world 40 renders an image 41 of the virtual 3D world as shown in FIG. 6). A viewpoint corresponds to position as a point (x,y,z), orientation as either a rotation matrix, quaternion, or axis vectors, and lens properties such as field of view angle, aspect ratio, or depth of field, of a virtual camera 42.

Virtual camera—a mathematical representation of a camera in a computer-generated virtual world world that defines a position (also known as the center of projection), orientation given by three mutually perpendicular vectors that establish the "front", "up", and "right". The camera aims in the direction of its "front" vector. The field of view angle, focal depth, and aspect ratio are also defined.

Virtual camera solver—an algorithm that given a desired set of composition properties and/or continuity properties or a desired composition encoding can analyze the geometry of a virtual world and the screenplay to determine a suitable assignment of values to a virtual camera so that the resulting image seen from that virtual camera sufficiently exhibits the desired properties.

Visual weight—the degree to which a viewer's eye is attracted to a given element in an image. Conventions of visual art and photography for example suggest that the following carry greater visual weight: larger or brighter objects, objects appearing higher in the frame, and that objects that contrast with their background.

DETAILED DESCRIPTION

FIG. 1 shows a schematic view of a system 10 in an embodiment of the invention. The system 10 is suited to be operated by a user in order to shoot and edit a film based on a computer-generated 3D virtual environment.

The system 10 is capable of providing a high level of automation in computing or exploring alternative or suggested indexed viewpoints that depict subjects and events of interest as they occur in a computer-generated 3D virtual environment and its corresponding screenplay.

The system 10 includes a user interface module 11 adapted for entering commands by a user and including at least one display screen 6 for displaying images and text. The system 10 includes a processing module 18 including a microprocessor 13 and a memory 14 (for example volatile computer memory (RAM) or permanent storage on disk). The user interface module 11 includes a physical device 12, operable by a user, with mechanisms embedded or attached to the device or positioned external to the device, that enable the real-time sensing of the three- or six-degree of freedom position and orientation motion of the said device. The device 12 may be a physical camera whose sensed motions (position, orientation) are used to produce correspondingly similar changes in position and orientation of a virtual camera. The display screen may be carried by the user or be located apart from the user, but within his or her view.

FIG. 3 shows one such physical device 12 in an embodiment including a display screen 4 with optional touch-sensing input, optional handgrips and/or physical buttons, levers, joysticks 2, and marker cluster 5 used to determine orientation and position of the device 12.

The physical device 12, when used as representing a virtual camera, can be manually controlled or adjusted by any possible actuations by a user of physical controls (e.g. joysticks, buttons, levers, knobs, . . . ), gestures, speech, touch, physical motion as detected by motion-sensor, or trained to detect and recognize motions or gestures in the area in which the user resides, or by manipulation of on-screen controls such as buttons, widgets, sliders, menu selections, mouse motions, key presses, and any other input modalities in which a user input can be directed to change one or more values that define a virtual camera viewpoint.

However, this invention may also operate on any combination of other devices that support its functionality. For example, the invention may run on a desktop computer and non-touch display monitor and the user interacts with the invention using a mouse or keyboard.

The invention is usable with current or future real-world physical camera and virtual 3D world cameras provided that the system can have available a mathematical model of the virtual 3d world and a screenplay defining events that have occurred The system 10 includes and uses several sources of information that are stored in memory 14.

Memory 14 includes software instructions, which once executed on the microprocessor 13, enable the processing by the system 10, in particular by the processing device 18.

The memory 14 further includes definition data of a 3D computer-generated world 15, including the three-dimensional geometry, colors, textures, audio, and animated actions of characters, objects, or other entities. The virtual world 15 may include sequences of actions such as one object moving from one point to another over a specific interval of time, a virtual character performing a gesture such as walking, etc.

Definition of characters or objects: A user or a software module can specify a optional mapping between element(s) of virtual world geometry, volumes of virtual world space, and/or intervals of animation time to symbolic names that can be used by the invention to for example, computer a virtual camera to view a named character or object. This mapping is part of the screenplay data source.

Screenplay: screenplay provides a predetermined list of events, where each event gives its start time and duration, the nature of the action, and list of characters or objects that perform that action. This information may be produced by a software system such as a narrative planner module, or be authored by a human such as encoding a real movie screenplay script with the animation timing data, or a recording of actions from a live performance (such as motion-capture of actor performances, a video game, or a training simulation. In the considered embodiment, a software module 16, e.g. a narrative planner, specify, using symbolic names or descriptors, a list of narrative events which occur at designated intervals of animated time in the virtual world 15. For example, the narrative event "Parsons walks to join Smith and Syme at the dining table" can be associated to the interval [S, E], where S<=E and S>=animation_start and E<=animation_end. For each narrative event the following attributes are specified:

[start, end] interval of animation time when this even occurs where start and end are each given as SMPTE time code values and start <=end.

Names of the virtual characters or objects that are the subjects of this event given as strings of characters.

Descriptive text for this event such as an action description (e.g. "Mike sits"), dialog spoken or thought by a character (e.g. "Where are we going?"), etc.

The processing module 18 of the system 10 is further adapted for maintaining a mathematical model of the position, orientation, and lens properties of a virtual camera and the objects in a given scene. In its current embodiment, movements of the physical device 12 equipped with motion sensors produces corresponding movements of a virtual camera in a computer-generated world and the user sees images of that computer-generated world when he inspects the computed viewpoints on the screen 4.

Future motion sensors could automatically capture physical objects including human performers to in real-time generate mathematical models of their position, orientation, size, and shape in addition to the position and orientation of an entity such as a human head, fingers, or physical device whose position and orientation correspond to the position and orientation of a virtual camera in a computer-generated world. Also, future motion sensors may be able to accurately track the position and orientation of real physical cameras as they move about in the real-world to view real performers/props or an augmented reality environment in which virtual characters or props are also visible in the camera viewfinder display.

Given a mathematical model of real world cameras and objects/characters, the system 10 of the invention can automatically compute and propose suggested viewpoints for a human camera operator to consider whether he or she is operating a real camera or a virtual 3D camera.

FIG. 2 shows steps of a method according to an embodiment of the invention.

In a step 100, the processing module 18 of the system 10 is adapted for computing one or more alternative viewpoints that represent distinct properties, for example visually distinct angles, shot distances, compositions and style, among other properties, that could be used to view or film given object(s) or action(s) occurring at a selected moment or interval of time in the computer-generated virtual world 15, according to the definition data of the 3D world 15, to the animation occurring in this world according to the screenplay in the planner 16 and if existing according to the shot list. The computation of alternative viewpoints entails the following sub-steps:

(a) generate list of alternative viewpoints
(b) compute a composition encoding for each alternative viewpoint
(c) rank these alternative viewpoints according to composition, continuity, occlusion of subjects, style (affinity or dominance between subjects), and the transition matrices.

In a step 101, the processing module 18 instructs the user interface 11 to display the respective images corresponding to the suggested alternative viewpoints on the screen 4 of the physical device 12, using both the composition encoding of each viewpoint and the ranking of alternate viewpoints.

For example, the processing module 18 automatically organizes the display of a set of viewpoints arranged by selected properties, for example cinematic properties including shot size, angle, or style. Thus, the user can rapidly review a variety of distinct alternative viewpoints that may be used to view or film the objects and/or actions for the current moment.

As shown in FIG. 4, in an embodiment, the suggestions are presented on screen as small movie frames 31 to 36, arranged in a grid whose rows and columns are function of user-selectable cinematic properties of the suggested viewpoints. A list of examples of cinematic properties is given hereafter.

The suggestions can be ordered in the horizontal axis from left-to-right by angle of the viewpoint regarding the line of action (front-left, left, rear-left). The vertical axis from top-to-bottom presents suggestions from shot distance in order of close to medium.

In another example, it can be ordered in the horizontal axis from left-to-right by decreasing shot length (or distance) in order of extreme long, long, medium, close-up, and extreme close-up. The vertical axis from top-to-bottom presents suggestions from a variety of camera heights in order of high, medium, and low.

FIG. 4 also represents an example of a stacked display of the images corresponding to the viewpoints (or sequences of viewpoints) and allows more to be displayed in a given amount of on-screen space. Stacks of images are shown in rows and columns that are arranged in order of selected cinematic properties, for columns by shot distance and rows by location of the subject in the frame (left or right). User can browse through the stack of viewpoints to display a different one on top. Viewpoints in the same stack share common cinematic properties. The number on each stack indicates the number of viewpoints in the stack.

FIG. 5 depicts an alternate presentation format with a top-down map view of suggested viewpoints positioned relative to subject(s) can also be selected.

In step 101, the user may optionally specify a preference to show only those alternative viewpoints that satisfy a desired composition, continuity, or style property. For example, only display alternate viewpoints that preserve line of action continuity by keeping the camera on the same side of the line of action. Or, oppositely, only show those alternative viewpoints that place the camera on the opposite side of the line of action. Or, show only those alternative viewpoints for which there is a distinct change in canonical angle or canonical distance between the previous viewpoint and the suggested alternative viewpoints. Or, show only those alternative viewpoints for which the canonical angle or canonical distance between the previous viewpoint and the suggested alternative viewpoints remains the same. Or, show only those alternative viewpoints for which the location in the frame of subject(s) between the previous viewpoint and the suggested alternative viewpoints remains the same. Or, show only those alternative viewpoints for which the location in the frame of subject(s) between the previous viewpoint and the suggested alternative viewpoints is distinctly different. Or, only show those alternative viewpoints in which one subject is dominate over another (which may be realized by viewing the dominant subject from low angles so that he or she appears to loom over the viewer).

In an embodiment, a graphical interface 4 may provide a set of icons that represent each of the aforementioned composition, editing, or style preferences setting by the user. These icons may be moved to occupy one of two separate areas on-screen, one for important properties and the other for less desirable or unimportant. An icon may be tapped to toggle through possible settings of keep similar, differ, differ by decrease, or differ by increase in that property. For example the user chooses to fix the on-screen facing direction of subjects by moving the facing direction icon into the "important" bin and then tapping this icon until a padlock appears beneath it. Computed suggested viewpoints will then all be on the same side of the line so that subjects appear to face in the same direction as they did in the given sample-set viewpoints.

For example, referring to FIG. 5, sections a, b, c, shows adaptation of viewpoints to reflect previously recorded shots. In the important properties box 24 shown in section a, the user taps the facing direction icon 20 until a padlock 21 appears below that property icon. The presence of the padlock next to the facing direction property icon instructs the system 10 to compute only those viewpoints that maintain the same on-screen facing direction of the characters It is assumed that in previously recorded shots subject A faces right-to-left and subject B faces left-to right. The user requests suggested viewpoints that depict both A and B. The user also specifies subject height (icon 22) and ground-plane angle (icon 23) are important.

Therefore, the processing module 18 computes suggested viewpoints 31 to 36 that vary by subject height and ground-plane angle (see section b of FIG. 5 presenting top-down map of viewpoints relative to subjects A and B), but preserve the previously established facing directions of the subjects.

The images of the 3D virtual world corresponding to these viewpoints 31 to 36 are then displayed on the screen in grid display according ground-plane angle and distance as shown in section c of FIG. 5.

In a step 102, the user selects a viewpoint.

In a step 103, the user optionally modifies the selected viewpoint, for example by manually controlling the physical motion-sensing device 12 representing the virtual camera rendering the image corresponding to the selected viewpoint. As explained hereabove, this control can be made by actuating a joystick, or by tracking moves or speech of the user into a tracking volume. The movements of the virtual camera 12 are identified by the processing module 18, that computed the accordingly modified viewpoints and corresponding images, based upon the definition data of the 3D world 15 and the movements of the virtual camera 12.

Then, upon confirmation of the user, the processing module 18 records in a step 104, the selected viewpoint, optionally modified, in the memory 14, as viewpoint of the film 17 for the selected moment.

In step 105, the processing module updates the transition matrices to represent observed transitions between the canonical angle and distance of the previous viewpoint and the canonical angle and distance of the current viewpoint.

Then the above steps are iterated for a next shot.

Instead of the selection in step 102, the user in step 102, ignores these presented viewpoints altogether and manually creates his or her original viewpoint(s), by operating the user interface 11, and in particular the motion-sensor device 12, or by speaking or moving in the tracking volume accordingly, to define virtual camera view. In addition, while the user manually adjusts the camera view or record camera moves, the system 10 presents hints and visual cues to help the user to record complex camera moves for a sequence of shots. In an embodiment, the thus created viewpoints are displayed in accordance with the display organization criteria used in step 101.

In an alternative embodiment, a user may specify desired continuity preferences (as noted in FIG. 5) by direct on-screen graphical manipulation. The user may touch the image of a subject on-screen to call up display of graphical "handles" that are overlaid on the image of that subject to indicate available composition or style properties applicable to that subject. For example, the user taps on the image of a character, e.g., Smith, in a frame and sees graphical handles (or icons) appear over his image that allow him to select Smith's height in the frame, his location in the frame, or his facing direction (etc). He taps on an open space in the frame to call up properties that apply to all subjects or the entire frame as a whole. The user can then select a property and push one of several context-dependent buttons to specify whether the system should maintain that "same" property or change it in a specified context-dependent fashion (less/more, opposite, etc.) when computing the next set of suggested viewpoints. The user may also make multitouch screen gestures such as dragging a finger in the desired facing direction, or pinching fingers out to indicate that subject height should increase.

The user instructions in other embodiments are inputted by voice input or gesture detection for example. In another embodiment, the user manually adjusts the virtual camera and the processing module 18 of the system 10 recognizes from the virtual camera adjustments what properties are retained or changed compared to what the system 10 previously suggested.

The system 10 is also able to automatically assist in determining the correspondence between real-world space and virtual world space when a position sensor is available. Current motion-sensing virtual cameras require their users to manually operate small joysticks to position, orient, and size the so-called volume of virtual world space into which the tracked volume of real-world space is mapped. Upon selecting a suggested viewpoint, the system 10 can automatically position and size the virtual camera volume so that a given amount of real-world motion corresponds to an appropriate distance of motion in the virtual world. The process computes the minimal bounding box enclosing a possible subset of all semantic volumes employed for the computation of automated suggestions.

In an embodiment, a user chooses to disable the automated viewpoint suggestion computing of the system 10, and then to creates his own set of alternate viewpoints by manually moving the virtual camera to record several different "takes" of the action at the considered particular moment in the screen-play The processing module 18 then automatically computes the composition encodings of the user's own originally created alternative viewpoints. It applies the same ranking function to order these user-created viewpoints. The processing module 18 then applies the same display method as described in step 101 to allow the user to review his or her alternative viewpoints. As in the preferred embodiment, the user can edit his movie by selecting and possibly further modifying the recorded viewpoints as described in steps 100 to 105.

The following is a description of elements of the invention's graphical interface in an embodiment.

Current camera view: The user works in this view displayed in the screen 4 when he or she wishes to preview animation or record/review camera animation as seen through the virtual lens of a given virtual camera viewpoint. This view is updated in real-time to reflect the current state of the virtual camera that is either being manually controlled by a user or playing back previously recorded virtual camera animations.

Computational Algorithms to find Suggested Viewpoints or Sequences of Viewpoints Overview The processing module 18 automatically computes a viewpoint to satisfy a given set of desired visual composition or continuity properties. Virtual camera solving methods typically refer to such desired properties as constraints on which subjects should appear in the frame and how they should appear in the frame as rendered from the resulting output virtual camera viewpoint. The research literature documents a variety of possible methods to solve this problem, which vary in computational workload, quality of solutions, expressiveness of composition constraints, and ability to deal with complex virtual 3D world geometry and movement. The processing module 18 according to the invention can operate using any existing or future automated virtual camera solver algorithm which has the ability to automatically compute virtual camera viewpoints, sequences of viewpoints, or moves that satisfy a given set of visual composition or continuity properties. Consequently, this section details the general features typically provided by an automated virtual camera solver.

Let us begin with a brief flowchart of the basic steps in automatically computing by the processing module 18 a virtual camera indexed viewpoint for a sequence of one or more given moments in animation time STEP A: Analyze Available Input Data Sources A1: Important visual composition and continuity properties.

A2: Selected set of previously recorded shots to be considered when finding suggested viewpoints or sequences of viewpoints that satisfy desired continuity properties.

A3: Scene and object geometry of subjects and nearby objects for each instant of animation time for which the system will compute viewpoints B: Repeat the following steps for each instant of time T[i] to be computed, where i is an integer between 1 and the number of instants of time to film.

B1: Formulate specifications for desired visual composition properties for suggested viewpoints for time T[i].

B2: Explore space of prospective satisfactory camera positions within the virtual 3D world B2.1: For each prospective camera position:

B2.1.1: determine suitable assignment of values to the remaining viewpoint attributes of orientation, lens angle, and focal depth.

B2.1.2: Compute visual composition encoding of the image as rendered from this candidate viewpoint.

B2.1.3: Apply a method to rank or evaluate how well the composition of this candidate viewpoint satisfies the specifications from B1.

B2.1.4: Analyze continuity of two viewpoints that appear in sequence

B2.1.5: Discard any viewpoints that are too similar to any of the best viewpoints found so far for time T[i].

B2.1.6: If it is satisfactory, then insert it into an ordered list Output[i] which stores the best alternate suggested viewpoints for time T[i]. Sort viewpoints within list Output[i] so that those satisfying more desired important properties appear ahead of ones which satisfy fewer or some other suitable scoring heuristic.

B2.2: Stop when either a given number of candidates has been examined, exceeded a limit on computation time, at least S>0 satisfactory viewpoints have been found, or a sufficiently representative portion of the search space has been explored.

C: Display the top N>1 viewpoints or sequences of viewpoints for user consideration.

Next, let's consider each of these general computational steps in greater detail.

A. Analyze Data Sources

A1. Given specified one or more important visual composition properties and optional preferences of continuity in those important visual composition properties. As specified hereabove, visual composition properties for a given subject include: size in frame, facing direction, overlap of subjects, etc. Continuity preferences include: lock property to same value, decrease, increase, or both increase and decrease a property.

A2. One or more previously recorded shots may be designated to be considered in analyzing the visual continuity in computing new suggested viewpoints or sequences of viewpoints. Previously recorded shots may occur either or both earlier or later in animation time than the viewpoints to be computed. For each previously recorded shot, the system will have computed and stored the visual composition encoding for one or more representative frames over the duration of the recorded shot.

A3. One or more subjects are designated by automated means by analyzing the given screenplay for the interval of animation time for which the system is to compute suggested viewpoints or sequences of viewpoints. Alternatively, a user may manually browse and select one or more subjects from a list of 3D objects available in the scene. For each subject, the system will be provided with a mapping to a specific set of 3D scene geometry (e.g. character's head) or bounding volume of space (e.g. the subject is the open sky above a mountain). In the system 10, the screenplay provides this data.

B1. Formulate Specification of Important Visual Composition Properties

The method used to formulate the specification of each designated important visual property varies by whether continuity preferences apply to a given visual composition property and whether or not there is a given set of one or more previously recorded shots which are to be considered in assessing continuity.

i) Continuity preferences not specified or no previously recorded shots are given ii) Continuity preference was specified and one or more previously recorded shots are available and have been designated to be used in assessing continuity a) If continuity preference is to lock or fix a given visual composition property, then take the specification of the desired visual composition property from the composition encoding of the most immediate preceding previously recorded shot (if available); else, take the property from the composition encoding of the immediate following previously recorded shot (if available).

For example, in facing direction continuity: when building two successive shots of the same key-subject, coherency must be maintained in the apparent direction of motion of this key subject, or with relation to his natural orientation. The problem is modeled by extracting the line-of-action (LOA) of the key-subject (direction of the key subject motion at the moment of the cut, or orientation of the torso) in both the previous and current shot. All suggestions on the same side of the LOA are ranked with a great value (similarly, all others are ranked with a low value). Line-of-interest continuity: In actions which involve two or more key subjects, once the camera is located on one side of the line-of-interest (imaginary line linking two key subjects), the camera should not cross the line in successive shots, unless using an extreme long shot (that re-establishes the key subjects in relation to the environment). All suggestions on the opposite side of the Line-of-interest are ranked with a low value.

b) If continuity preference is to decrease a given visual composition property then take the specification of the desired visual composition property from the composition encoding of the most immediate preceding previously recorded shot (if available); else, take the property from the composition encoding of the immediate following previously recorded shot (if available) and diminish its value by performing one of the following actions:

for subject size property: diminish dimension (height, width, or area) by minimum increment (usually 15% or more by film convention so resulting shots appear distinct from prior shots).

for location in the frame: shift location by minimum increment (usually 15% or more) to the left and/or downwards.

for overlap or occlusion: specify that no occlusion or overlap is desired for cropping of subject(s) by frame edge(s): specify that no cropping is desired for subject facing direction: reverse the subject facing direction for ground-plane angle: shift desired ground-plane angle clockwise moving around
the subject by minimum angular increment (usually 15 degrees or more).

for height angle: shift desired height angle lower relative to subject(s) by minimum angular increment (usually 15 degrees or more).

for visual weight: specify that majority of visual weight should lie on the left half of the frame.

c) If continuity preference is to increase a given visual composition property then take the specification of the desired visual composition property from the composition encoding of the most immediate preceding previously recorded shot (if available); else, take the property from the composition encoding of the immediate following previously recorded shot (if available) and increase its value by performing one of the following actions according to given rules.

B2. Exploration of the Search Space of Camera Position

The solver algorithm generates and tests one or more sets of candidate camera viewpoints within the search space. The search space is infinitely large since it spans at least 8-degrees of freedom—camera position (x,y,z), camera orientation (rotation angles about 3-axes), lens field of view angle, and lens focal depth. Consequently an exhaustive search is not feasible so a preferred embodiment would apply one or more combinations of methods to limit search to those assignments of values over the 8-degree space that are most promising. In general, most methods first explore the position parameter. Techniques to explore the search space include, but are not limited, to the following four general classes of methods or some combination of these methods:

1) relative viewpoints—A study of blocking diagrams from film textbooks [Arijon 1976—Grammar of the Film Language. Hastings House Publishers.] suggests that for given situations, such as actors in conversation, there is a finite set of preferred viewpoints for covering that action. In a shot of one virtual character or object, form a line of action vector that corresponds to the forward facing direction of that character or object. In a shot of two or more, form a line of action vector that passes through a line joining the two principal figures or that bisects the space occupied by the characters. Each candidate viewpoint may be defined by measuring off pre-defined angles from the line of action vector along the ground plane (in which the actors lie) and/or a vertical plane that is perpendicular to the ground plane. Given a fixed lens field of view angle, a preferred distance is computed to step back the camera along each desired viewing angle relative to the line of action. Having set desired angle and distance, it would generally also be wished to aim the camera so that one key subject projects to a given point in the frame. Blinn's proposes closed-form algebraic equations to find the camera aim vector to project one or two desired points [Blinn 1988—J. Blinn, Where Am I? What Am I Looking At?, Computer Graphics and Applications, IEEE, vol. 8, no. 4, pp. 76-81, 1988.]. The Virtual Cinematographer utilizes this technique [Li-wei et al. 1996—"The Virtual Cinematographer: A Paradigm for Automatic Real-Time Camera Control and Directing," in SIGGRAPH 96 Proc., Computer Graphics Proc., Annual Conference Series, pp. 217-224].

2) local-search—Given a candidate camera viewpoint, repeatedly make small increments to the viewpoint parameters to explore the local neighborhood of search space around the initial viewpoint. For example, if an initial viewpoint found is occluded, try moving that candidate camera position to the right and re-evaluate until an occlusion-free view is found. Other general local search optimization methods such as genetic algorithms [Olivier et al. 1999] or particle swarm optimization (PSO) can also be employed [Burrelli et al. 2008].

3) intelligent global search—use knowledge of the constraints and virtual world geometry to cull unpromising parts of the search space. A method of deriving bounds on the search space of prospective camera positions from the constraints is disclosed in [Bares et al. 2000—Virtual 3D camera composition from frame constraints. In Proceedings of the ACM international conference on Multimedia (MULTIMEDIA '00), ACM Press, 177-186]. Each of these aforementioned techniques considers viewpoints only at discrete points and may miss optimal viewpoints that fall in between two adjacent candidates.

4) semantic volumes—partition the search space into distinct volumes of space such that all camera positions within a given volume yield a semantically identical camera shot. Each semantic volume is identified with a desired angle and distance from cinematography convention such as front-right side and medium distance. Semantic volumes can be created using a set of any combination of one or more binary-space partitioning planes (BSP) or spheres. For a single subject, use BSPs to divide space into semantically distinct views along the ground-plane angle by front, front-left, left, rear-left, rear, rear-right, right, and front-right. Each plane is rotated 45 degrees from its neighbor and is parallel to the vertical axis of the subject. Each 45 degree "pie slice" can be further subdivided along the vertical dimension to divide space by camera-to-subject height low, eye-level, high, etc. For two subjects, a line of action is formed passing through the two subjects and set the first BSP plane through the line of action. This process is illustrated in a top-down view of two subjects along with examples of the distinct camera viewpoints within each partition. If one camera position inside one partition is selected and a second camera partition inside a different partition is selected and render the corresponding images of the subjects as seen by these two cameras, it is guaranteed to have two frames that are distinct in their composition. Distinctive variations include: subject A appears to left of B, subject A appears to right of subject B, subject A overlaps subject B, etc.

5) director volumes—partition the search space into distinct volumes of space such that all camera positions within a given volume yield a semantically identical camera shot and a identical visibility information on subjects. This partition is built by combining both a partition of semantic volumes and a partition of visibility volumes. Such visibility volumes may be recursively computed by propagating visibility information of each subject through a spatial structure describing the 3d environment (e.g. a cell-and-portal structure). This concept enlarges the concept of semantic volumes to 3d environments where occlusions can occur.

Instead of attempting to find globally best viewpoints over the entire search space, the director volumes method tries to find at least one optimal viewpoint inside each semantic volume. This concept of using semantic volumes to generate viewpoints that express distinct angle and shot distance coverage was proposed in [Christie and Normand 2005—A semantic space partitioning approach to virtual camera control. In Proceedings of the Eurographics Conference (EG 2005), Computer Graphics Forum, vol. 24, 247-256], and the concept of using director volumes to generate viewpoints in which one can both handle the semantic properties of shots and the visibility of subjects in the shots was proposed by two of the authors of this invention [Lino et al. 2010—A Realtime Cinematography System for Interactive 3D Environments. In Proceedings of the 2010 ACM SIGGRAPH/Eurographics Symposium on Computer Animation, Eurographics Association, 139-148]. This technique is especially well suited to the operation of this invention since it produces a top N list of viewpoints that represent distinct angles and distances while simultaneously limiting the number of candidates tested. Given a limited amount of on-screen space and time that a user may wish to spend viewing automatically-computed suggested viewpoints, presenting suggested viewpoints that are distinct in angle and distance, among other properties enables this invention to offer its user a wide range of "good" starting viewpoints from which he or she can subsequently refine by making what will now be smaller and less time-consuming adjustments using the virtual camera.

B2.1.: For each prospective camera position generated by the previous step do the following to fully assess its suitability:

B2.1.1: Computation of Field of View angle, Orientation, and Focal Depth

The remaining camera parameters can be computed in any order and it may be necessary to adjust previously computed values since a choice made to optimize a latter parameter may result in an unsatisfactory result for a former parameter.

i) Computation of Field of View Angle

Depending on user preference, the user may choose either a fixed focus lens with fixed field of view angle or a variable focus lens in which field of view angle can vary between a given minimum and maximum range. If the user has selected a fixed focus lens (as is quite common in real-world cinematography), then the virtual camera lens field of view angle is simply assigned to the user-specified angle. Otherwise, one or more candidate field of view angles that lie within the desired minimum and maximum angle values must be generated and tested. If the user specifies that any measure of subject size that may be expressed by desired height in the frame, subject area in the frame, or width in the frame, then the lens field of view angle is computed so that the perspective projection of the subject covers the desired size in the 2D picture frame. Given vpdist the distance from viewpoint (center of projection) to perspective projection plane and given H desired height of subject in the frame (as a normalized fraction 0 to 1.0, for full frame height), the vertical field of view angle is computed as Arctangent of (square root of (PlxRadius of subject(s)/H)/vpdist). Otherwise, if the user has not specified that subject size is important, then a default field of view angle is computed that attempts to fit as much of the subject as possible within the frame.

ii) Computation of Orientation

The virtual camera's orientation directly determines the direction in which it is aimed and the amount and direction of canting (or roll about the aim direction vector). This in turn determines the location within the frame to which a given point in the 3D world projects. Consequently, computation of camera orientation controls the position of subjects within the frame and cropping of subjects at the frame edges. One straightforward approach is to assign the camera's aim (or look ahead) direction to be directly at the center of all subjects for the given shot. This will center the subjects in the frame. One may find suitable displacements of the camera aim direction so that subjects are placed to left of, right of, below, and/or above center of the frame for added composition variety or to match subject placement in a previous composition. The following technique was proposed by Bares [*A Photographic Composition Assistant for Intelligent Virtual 3D Camera Systems*. Smart Graphics 2006: 172-183. 2005].

Given a translation (dU, dV), expressed in normalized frame coordinates, find the new camera aim direction to pan the frame. A reference point RefXyz at the center of the subject geometry is given. Compute the new aim direction N-axis as follows:

$v = dV * 0.5 * pHeight$

Find length h of hypotenuse vector H of the right triangle formed by camera position, translated point (dU, dV) and yet-to-be-determined N-axis.

$h = \text{sqrt}(v*v + pDistance*pDistance)$

Let camPosToObj=refXyx−cameraPosition $H = h * camPosToObj$

Set local camera system U-axis vector ("right hand of virtual camera person").

$U = H \times UP$, where $UP$ is the world's global "up" vector.

Find angle β in radians between vectors H and yet-to-be-determined aim vector N.

$\beta = a\sin(v/h)$

Let Q be the quaternion representing the counter-clockwise rotation about U by angle β. Convert the quaternion into an equivalent 4×4 rotation matrix.

$rotMatrix = Q \cdot convertTo4 \times 4Matrix()$

Rotate H counterclockwise by angle β about axis U to form updated N vector.

$N = rotMatrix \cdot transformVector(H)$

Find u, the projection of dU onto the perspective frustum.

$u = dU * (0.5 * pWidth/aspectRatio)$

Find length h of the hypotenuse of right triangle formed by camera position, translated point (dU, dV) and to-be-determined N-axis.

$$h=\text{sqrt}(u*u+p\text{Distance}*p\text{Distance})$$

Angle in radians between vectors H and N-axis: $\ominus$=-a sin(u/h)

Let V=U×N. Q is the quaternion to rotate N clockwise by $\ominus$ about axis V.

$$\text{rotMatrix}=Q\cdot\text{convertTo4×4Matrix}(\ )$$

$$N=\text{rotMatrix}\cdot\text{transformVector}(N)$$

Normalize the new local camera coordinate system axes vectors U, V, and N. Vector N becomes the new camera aim direction vector, U its "right hand", and V its "hat".

B2.1.2: Visual Composition Encoding

The composition analyzer function in the processing module 18 computes a composition encoding for a given virtual camera viewpoint and current configuration of the virtual 3D animated world and generates a machine-readable composition encoding of the elements of visual composition that characterize a rendered two-dimensional image of the virtual 3D world as observed from the given viewpoint. If a definition of characters or objects is provided, this module will concentrate its effort on analyzing how designated characters or props appear in the rendered image and will ignore designated irrelevant background entities such as the ground or sky. For each character or prop that lies partially or entirely within the virtual camera's field of view frustum, the analyzer will apply the perspective projection equations to the geometric representation of that object or to a reduced resolution approximation of its geometry to estimate that object's projection onto the rendered image. For each visible object in the camera field of view, the analyzer will compute and store the following information:

Rectangle which encloses the two-dimensional projection of the object

Unoccluded object shape pixel map—rectangular array of binary values (1=pixel is part of the projection of the object's shape and 0=pixel is not part of the projection of the object's shape. This map is computed by rendering in an off-screen buffer a monochrome image of the object alone as it would be seen from the current viewpoint.

Visible object shape pixel map—rectangular array of binary values where a 1 means that pixel is both part of the projection of the object's shape and is not occluded by another object and 0 otherwise. The pixels that are 1's in the unoccluded shape map, but 0's in the visible object shape map represent pixels of the object that are occluded by another object.

Fraction of object not in occlusion=number of 1's in the visible shape map divided by the number of 1's in the unoccluded shape map Vector (deltaX, deltaY, deltaZ) from the center of the virtual character, object, or designated portion thereof (e.g. eyes of a virtual actor) to the position of the virtual camera Some framing properties such as relative angle to the camera are trivial to calculate accurately and efficiently. For example, suppose that a constraint is to view subject S with the camera placed along relative view vector V. Compute vector C from the subject to the candidate camera position. If vectors V and C are both unit-length, then the angular difference in radian measure between desired view angle vector V and candidate view angle vector C is found by the equation:

$$\text{angle } A=\arccos(\text{dot\_product}(V,C))$$

The quality score for how well this viewpoint satisfies this relative view angle constraint is inversely proportionate to the size of angle A. A smaller angular difference will be awarded a higher quality score.

Properties that involve the size or location of an object in the frame can be evaluated by performing a perspective projection of the object and then analyzing the size and position of the two-dimensional projected share with respect to the composition property (e.g. does the subject lie entirely within the frame). These computations can be performed using a low-resolution or approximate shape of the object or a high-resolution point-by-point representation of the intricate features of the shape. The most common approximation is to substitute the potentially tens of thousands of polygons that compose a realistic 3d model with a set of one or more simpler primitive shapes that approximate the overall shape of the model. For example, use a set of spheres or boxes to enclose the true model shape. The analyzer would then project a number of representative points on or within these bounding primitives to form a set of points on the two-d image plane. The analyzer could then form a primitive rectangle boundary that encloses all projected points. For evaluating whether or not the object lies entirely inside the frame, then it checks if no part of the rectangle that bounds the object's approximated projection lies outside the rectangle that comprises the frame border. Other composition properties can be evaluated using a range of possibilities.

In general, evaluating if all or part of an object is occluded assumes one of two variations that vary in accuracy and compute time.

Ray Casting: Cast rays from the camera position to each of the 8 vertices and midpoint of a potential obstruction's bounding box. The number rays resulting in a hit is used to estimate the fraction of the object in occlusion. For increased accuracy the method may utilize an oriented bounding box which rotates to more closely fit the shape of the enclosed object. Complex objects such as a humanoid shape can be better approximated by hierarchies of nested boxes such as boxes to enclose the lower arm, upper arm, torso, head.

Frame Rendering: The available graphics rendering module can generate a pixel-map image of each subject of interest into an off-screen (not displayed) buffer, which is then read into memory which the solver algorithm can process. Each subject is rendered in a unique solid color. Any other potentially occluding object is next rendered whose bounding box is intersected by a ray cast query from the candidate viewpoint position to the endpoints of the subject's bounding box. If any of the pixels of the potential occluding object overwrite pixels of the subject, then the potential occlude does indeed occlude or overlap our subject. A count is made of how many pixels of the subject are in this way over-written by pixels of occluding object to obtain a more accurate estimate of the fraction of the subject that is occluded, by which object it is occluded, and which parts of the subject are occluded.

Computation of Visual Weight may be found using the method proposed by Bares in [*A Photographic Composition Assistant for Intelligent Virtual 3D Camera Systems*. Smart Graphics 2006: 172-183. 2005]

(i) Per-Subject Visual Weight

Compute the weight of each visible element in the frame by accumulating the following components, each of which is evaluated as a normalized value between 0 and 1.0.

$$\text{brightnessWeight}=\text{maximum intensity}(\text{red,green,blue of element's color})$$

The application specifies the predominate color of each subject horizontalWeight=AbsoluteValue(element·CenterX( ))/(0.5*frame·width( ))

Increase by 10% if element is left of frame center verticalWeight=(element·CenterY( )−frame·minY( ))/frame·height( )

sizeWeight=element·diagonalLength( )/frame·diagonal( )

gazeWeight=number of elements pointing to this element/(numElements−1)

For gaze, compute the angle between element E's projected heading vector and a vector directed from the center of element E to the center of subject being weighed.

(II) Overall Visual Weight of all Subjects in the Frame

Given that the visual weight of each element is wi and the horizontal u-coordinate of each element is ui. To computer the u-coordinate of the Center of Visual Weight:

$$centerU = \sum_{i=1}^{num\_elements} w_i * u_i$$

The v-coordinate of the Center of Visual Weight is found in a similar fashion.

B2.1.3. Evaluating or Ranking the Quality of a Candidate Viewpoint

The solver algorithm assesses each candidate viewpoint to estimate the degree to which that camera viewpoint satisfies each of the designated important visual composition properties.

In a preferred embodiment the following ranking method is employed:

Once a set of suggested viewpoints is computed, our system performs a quality ranking process, whose result is used when displaying the suggestions to the user. The quality qs>0 of a suggestion s is defined as the product of qualities assessing specific features of s:

qs=Qcont(s)*Qcomp(s)*Qr(s)*Qt(s)

with

Qcont(s)=Qloi(s)*Qchange(s)

where Qcont measures the enforcement of continuity rules, Qloi measures enforcement of the line-of-interest rule, and Qchange measures compliance with distinct change in canonical angle and canonical shot distance. Qcomp represents the satisfaction of composition rules, Qr represents the relevance of the suggestion with relation to the current action's relevance, and Qt represents the quality of the transition between the current shot and the suggestion.

First consider continuity in the Cut: We rely on the following continuity rules to establish the ranking Qcont(s):

(a) Line-of-interest continuity: in actions which involve two or more subjects, once the camera is located on one side of the line-of-interest (imaginary line linking two key subjects), the camera should not cross this line in successive shots, unless using an extreme long shot (that re-establishes the key subjects in relation to the environment). The system ranks all suggestions on the opposite side of the Line-of-interest with a low value.

(b) Change in angle or size: When considering two shots portraying the same subject, there should be at least a thirty-degree difference in orientation with relation to the subject, or a notable difference in canonical distance shot. Our system computes the difference in angle and size between the current shot and the suggested shot. Only suggestions with noticeable difference in size are ranked positively (here we consider a change of at least two units in size, a unit being a step between two canonical distances in shots in the range of Extreme Close Shot, Close Shot, Medium Close Shot, Long Shot and Extreme Long Shot). Suggestions that subtend an angle lower than 30 degrees to the subject are ranked with a low value.

Then consider classical composition rules. Viewpoint suggestions computed by the system try to enforce the classical rule of the thirds. The composition is set so that the characters eyes (an element to which spectators look at in priority when gathering elements in a picture) are located at the intersection of two equally spaced horizontal lines and two equally spaced vertical lines on the screen. We thus measure as an Euclidean distance the difference between the ideal composition and the composition computed by the system to asses the quality of a viewpoint. Bad compositions are ranked with low values.

Third we consider relevance of the shot w.r.t. current action. Relevance is measured by exploring the capacity of the shot to enforce the legibility of the action by the user. Each action has a relevance value that encodes its importance for the story (e.g. representing whether the action is a foreground action, an establishing action, or a background action). Shots that depict more relevant actions, from relevant viewpoint enforce the comprehension of the story and will have a higher quality. Finally we consider quality in transitions which is measured by using transition matrices. The quality of the transition is given by an affine function y=ax+b, where a>0; b>0 and x is equal to the value tk ij related to the transition in the corresponding transition matrix Tk.

In an alternate embodiment, the system 10 may also analyze continuity wrt the following properties, in the computation of ranking. By considering two viewpoints, the system analyses the computed composition encoding for the given pair of viewpoints. For each desired composition property and subject, it determines whether or not that property remains constant (CONSTANT) or changes (CHANGES) in going from the first viewpoint to the second. Without loss of generality assume that it has to be determined if all visual composition properties retain the same in going from the first viewpoint to the second viewpoint.

1. presence of a given subject in the frame: output CONSTANT if specified subject is visible in both frames or if the specified subject is not visible in both frames else output CHANGES.

2. projection location: output CONSTANT if the distance between the center of the subject in viewpoint 1 and viewpoint 2 is less than a specified threshold T; else, output CHANGES distance(center in viewpoint 1−center in viewpoint 2)<$T$ 3. projection location relative: output CONSTANT if the center of the subject projects to the same relative side of the specified line of reference for both viewpoints; else, output CHANGES.

5. overlap of subject: Output CONSTANT if the subject is overlapped by the same other object(s) in both viewpoints and the amount of overlap is such that absolute_value(overlap(viewpoint 1)−overlap(viewpoint 2))<$T$ else, output CHANGES.

6. occlusion minimize: output CONSTANT if the absolute value of the difference between the amount of occlusion of the subject as seen in both viewpoints is less than threshold T; else, output CHANGES $$absolute\_value(occlusion(viewpoint\ 1)-occlusion(viewpoint\ 2))<T$$

7. occlusion maximize: output CONSTANT if the absolute value of the difference between the amount of occlusion of the subject as seen in both viewpoints is more than threshold T; else, output CHANGES.

$$absolute\_value(occlusion(viewpoint\ 1)-occlusion(viewpoint\ 2))<T$$

8. Cropping at frame edge: output CONSTANT if the subject is cropped or clipped by the same edge(s) of the frame in both viewpoints; else, output CHANGES 9. Object in focus: output CONSTANT if the distance between the camera position and center of the subject lies less than T units of the distance of sharpest focus for both viewpoints; else, output CHANGES 10. Object blurred: output CONSTANT if the distance between the camera position and center of the subject is more than T units of the distance of sharpest focus for both viewpoints; else, output CHANGES 11. Visual weight: output CONSTANT if the sum of the visual weight of all subjects is concentrated in the same region (left of center, center, or right of center) of the frame for both viewpoints; else, output CHANGES In assessing continuity using the above properties, a user may prefer that a given property remain constant in going from the prior viewpoint to the current viewpoint or that the property change in going from the prior viewpoint to the current viewpoint. In the first case, we will assign a higher continuity rank score if the property is evaluated to be CONSTANT by the aforementioned heuristic functions. For example, we have a subject appear at the same size in both prior and successive viewpoints. Otherwise, in the second case, we assign a higher rank score if the property is evaluated as CHANGES. For example, we have a subject appearing at distinctly different sizes in the prior and successive viewpoints.

B2.1.5: Discard viewpoints that are too similar to previously found suggestions

In order to maximize the number of distinct visual compositions presented for the user to consider, the system must be mindful to not present two or more suggested viewpoints that appear to be too similar to one another in their visual composition. Conventions of cinema suggest that when cutting from one shot to another, the second shot must differ sufficiently from the first to avoid a jarring "jump cut" [Arijon 1976]. When considering two shots portraying the same subject, there should be at least a thirty-degree difference in orientation with relation to the key subject, or a notable difference in the size of the subject in the shot. For this purpose the difference in angle and size between the current shot and the suggested shot is computed. Only suggestions with noticeably difference in size are ranking positively (here a change of at least two units in size is considered, a unit being a step between two shots in the range of Extreme Close Shot, Close Shot, Medium Close Shot, Long Shot and Extreme Long Shot). Suggestions that subtend an angle lower than 30 degrees to the subject are ranked with a low value.

B2.1.6: Sort output list of suggested viewpoints or sequences of viewpoints

If the viewpoint is satisfactory, then insert it into an ordered list Output[i] which stores the best alternate suggested viewpoints for time T[i]. Sort viewpoints within list Output[i] so that those satisfying more desired important properties appear ahead of ones which satisfy fewer.

Increment specifications for next iteration or end search for suggestions

If there is a next moment of time for which suggestions are desired, then advance the model of scene geometry to represent that next moment of animation time.

B2.2: Stop when either a given number of candidates has been examined, exceeded a limit on computation time, at least S satisfactory viewpoints have been found, or explored a sufficiently representative portion of the search space C. Display Best Suggested Viewpoints or Sequences of Viewpoints Suggested viewpoints or sequences of viewpoints are presented in a manner that enables a user to readily compare the designated important visual composition properties. In a preferred embodiment, suggestions may be presented in a single row, a single column, a grid of rows and columns, or a top-down or profile map view that illustrates the relative angle or position of each viewpoint to the subject(s). Suggestions are sorted by order of one or more properties. The system 10 provides a facility for a user to select by which properties the suggestions are ordered. For example, if the user designates a single property such as subject height as important, the system can display the images in a single row or column or in a top-down map that reveals viewpoints arranged by varying distance from the subject (assuming a fixed field of view for all viewpoints). The images are displayed sorted by increasing or decreasing order of the selected property (e.g. subject height). If two or more important properties are specified, the system can display the suggestions in a grid of rows and columns with rows representing variations in one property and columns representing variations in a second property. Images within each row and column are sorted by ascending or descending order of their respective property. In displaying a top-down map of the suggested viewpoints, the system displays each subject by its name, a symbolic icon, or image of that subject. Each suggested viewpoint or sequence of viewpoints is displayed around the subjects so that the position of each viewpoint's image reflects the relative ground-plane angle and distance between camera and subject for that viewpoint. The system may need to slightly shift viewpoints to avoid overlap or stack viewpoint images one atop the other, especially in the case of sequences of viewpoints.

If not all suggestions can be displayed simultaneously, the system can stack viewpoint images one above the other with a slight jog so that underlying images are slightly visible below the topmost image. The system can display a number next to the topmost image in a stack to indicate how many additional suggestions are below the topmost image in the stack, and user may navigate through the stack In the grid display format, a user can select one row or column to expand to display additional viewpoints just from the stacks of viewpoint images within that selected row or column. A user can step back to the previous display of stacked viewpoints if desired. A user can also touch and slide gestures or press a button (on-screen or on the virtual camera device) to scroll through a row or column or stack of suggested viewpoints.

Manual Adjustment of a Suggested Viewpoint

The user may select a suggested viewpoint and wish to improve its composition by manually controlling the virtual camera 12. The processing device 18 of the system 10 initializes a virtual camera to have identical parameter values to that of the selected suggested viewpoint. The processing device 18 initializes scene geometry and state to reflect the moment of animation time corresponding to the selected suggested viewpoint (e.g. 10 seconds into the start of scene 2). The system 10 invokes the rendering engine to render an image of the virtual world as seen from the selected virtual camera. The system then maps user inputs of the virtual camera control device to continuously update one or more of the virtual camera position, orientation, lens field of view, and focal depth. For example, position (x,y,z) data from a position sensor will map to virtual camera position and actuating a joystick lever will increase or decrease lens field of view angle, etc. This invention applies to any means in which a user's inputs or gestures can be mapped to changes in one or more virtual camera parameters. Since many position and orientation sensors output absolute coordinate data, a conversion step is applied to change incoming position and/or orientation data into relative increments. This is the key step in enabling the user to immediately begin adjusting the selected viewpoint regardless of his or her position or orientation in the tracking volume in the real world.

a) Increment position: Let the initial camera position corresponding to the selected viewpoint be point V(x,y,z). Upon beginning manual camera control, the system notes the currently reported absolute position reported by the position sensor (e.g. 10, 5, −20). The system denotes this as start position S(x,y,z). The system computes the difference or displacement vector D in moving from the start position to the current sensor position C(x,y,z).

$$D = C - S$$

Update the virtual camera position to be V+D.

In this way regardless of where the user is standing in the real-world space relative to the position sensors, if the user walks forward in the direction he or she has the virtual camera pointed, then he or she will see the virtual camera view step forward by an amount proportionate to how far the user moves the device or position sensor.

b) Increment orientation: Let the initial camera orientation corresponding to the selected viewpoint be the quaternion V(x,y,z,w). Upon beginning manual camera control, the system notes the currently reported absolute orientation reported by the orientation sensor and denotes this as start orientation S(x,y,z,w). The system computes the difference quaternion D in turning from the start orientation to the current sensor orientation C(x,y,z,w).

$$D = \text{conjugate}(C) * S, \text{ where } S \text{ is the conjugate of a quaternion and } * \text{ denotes multiplication of quaternions.}$$

Update the virtual camera orientation to be V*D.

In this way regardless of where the user is oriented holding the virtual camera device in the real-world space, if the user turns his or her body 5 degrees to the left or turn the device or orientation sensor 5 degrees to the left then he or she will see the virtual camera view turn or pan 5 degrees to the left.

Thus by converting sensor data into relative increments, the user can begin adjusting a suggested viewpoint by making small displacements beginning from the selected viewpoint. Consequently, the user does not need to waste time manually moving or turning the camera to find the selected suggested viewpoint. He or she can immediately begin work from that selected viewpoint in the virtual world regardless of how he or she or the virtual camera device is positioned or oriented in the real world at the moment he or she requests to begin manual adjustment of a selected suggested viewpoint. The user can then play the animation of the virtual world and also record his or her own camera movements or changes to any of the camera parameters as animation time plays out the scene to be filmed.

Manual edit of multiple viewpoints at once: The above technique can be applied to simultaneously adjust the two or more selected viewpoints such as moving the camera closer by D units. For each viewpoint to modify, increment camera position by D*F, where F is that viewpoint's camera front or aim vector. Likewise, if a move left by D units is done, then for each viewpoint increment its camera position by D*−R, where R is that viewpoint's camera right vector. Incremental changes in orientation are propagated in a similar fashion by multiplying the relative quaternion angular change against the current orientation quaternion of each viewpoint.

Crossing the line: The system can automatically edit a viewpoint by jumping the camera to the opposite side of the line of action. This is done by reflecting the camera position and camera aim (or "front") direction vector about the line of action vector (FIG.).

Methods by which the system visually organizes, arranges, and facilitates browsing and editing of a set of viewpoints:

These viewpoints may have been computed by the processing module 18 to serve as suggestions or manually created by a user to represent the user's own proposals for alternative viewpoints for filming a given narrative event or events. The same algorithms and interface methods that used to organize and browse computed suggestions may then be applied to organize and browse human-created viewpoints or viewpoints that result from human modification of computer-suggested viewpoints.

Organizing a Set of Viewpoints

Assume that a collection of viewpoints represent alternative ways to view the objects or actions for the currently chosen moment in time in a computer-generated animation 1) The user may select those composition, editing, or stylistic properties by which the viewpoints will be organized 2) The user may select to organize the viewpoints by ascending or descending order with respect to a selected property 3) The system will automatically form clusters of viewpoints such that all viewpoints in the same cluster share a sufficient degree of similarity to one another with respect to a specified composition, editing, or style property. For example, all shots in which a subject's projected bounding rectangle lies primarily within the same Rule-of-Thirds grid square would be placed in the same cluster. A preferred embodiment relies on the Semantic Volumes to enumerate viewpoints in a cluster since by definition of semantic volumes, all viewpoints in a given semantic volume are known to be sufficiently similar by distance, angle, and occlusion/overlap properties.

When displaying clusters of viewpoints in the grid, each cluster goes into one stack of images. The clusters are arranged by ascending or descending order along the rows by one selected property, then by another property along the columns.

Displaying a Set of Viewpoints

Displaying the viewpoints is organized for example in grid of stacks as a function of corresponding camera length, camera angle and/or quality.

Displaying a visual representation of each viewpoint is for example by one or several of:

a) Displaying the viewpoints in a line arranged by ascending/descending order of property;

b) Displaying the viewpoints in a rectangular grid where rows vary by one property and columns vary by a second property;

c) Displaying clusters of similar viewpoints in one stack of small images that depict the computer-generated image as seen from that virtual camera;

d) Displaying viewpoints or stacks of viewpoints so that their location on-screen reflects their properties;
  a. Displaying high angle viewpoints higher up on the screen;
  b. Displaying viewpoints that depict subjects from the left on the left of the screen;
e) Displaying viewpoints or stacks of viewpoints in a graph structure with nodes being the viewpoints or stacks of viewpoints;
f) Display viewpoints or stacks of viewpoints in a rectangular grid where each column represents a different moment or interval of time and one or more rows represent variations in viewpoint arranged by one selected criteria (FIG. 4—horizontal axis is time).

Browsing Viewpoints

The user may step forwards or backwards through discrete moments of time (e.g. dramatic events in the screenplay) or intervals of continuous animation time. Upon changing the current moment of time, the display will update to show only those viewpoints that were created during the currently selected moment or interval of time. Viewpoints displayed would have been automatically computed as suggestions for how one might film that moment or were previously created through partial or complete human manual control of the camera. In one usage, the invention computes all viewpoints (as suggestions) to be displayed to the user to consider for filming the current moment. In a second usage, the user manually controls the camera to record several alternative takes of the same interval of action. So input are several user-created traces of virtual camera work where for one or more moments or intervals of time, the user has recorded several different viewpoints. On browsing to a given moment in time, the system displays those user-recorded viewpoints that occur at the currently selected moment. The user can moment-by-moment explore his original camera viewpoints.

The user may request that the system 10 compute additional suggested viewpoints that present additional variations in the specified composition, editing, or style properties. For example, he wants to see viewpoints from much lower heights than the ones currently displayed.

Movements or gestures reported by the motion sensor can be interpreted as browsing actions to explore the space of alternative viewpoints. For example, pan (turn your body or the device) to the right to request that the system compute and display suggested viewpoints that place the camera more to the right of the subjects than the previously shown set of suggestions. Similarly, walk forward, to request that the system compute and display suggested viewpoints that are closer to the subject.

Rapid Editing of Virtual Movies

For a given moment in time with its associated set of alternative viewpoints, the user may select which one viewpoint he prefers for viewing/filming the current moment. By moving moment-by-moment through the story a user can see a set of alternatives for that moment, choose one, then move on to the next moment.

S1. Compute and display suggested viewpoints for current moment
S2. User chooses one viewpoint, which he may accept as-is or modify by manually operating the virtual camera
S3. Advance to next moment of time
S4. Repeat at step S1 until user chooses to quit.

Automated Computation of Position Tracker Working Volume

The system can automatically compute and suggest the mapping between the tracker volume (real world workspace within which motion can be sensed) and the volume of virtual world space into which tracked real-world points will be mapped. It does so by forming a volume that encloses all promising viewpoints (camera position) found as the system's automated cinematography module computes suggested viewpoints.

Depending on the anticipated amount and range of movement needed to film a given shot, the system can automatically determine the volume V of virtual world space into which sensed real-world positions are mapped. If only close shots of subject A are to be framed, then the volume V is centered closely around subject A. By decreasing the size of volume V, more precise adjustment of virtual camera position is facilitating since moving distance D in the real world results in a correspondingly smaller increment of position in the virtual world. Inversely by increasing the size of volume V a given movement in the real-world produces a corresponding larger movement in the virtual world. Furthermore, volume V is centered around the anticipated position(s) of the subject(s) over the duration of animation time spanned by a given shot.

Let V be an initially empty volume expressed as a bounding box.

For each moment of animation time $T[j]$ for which viewpoints are computed:
  For each candidate viewpoint camera position $C[i]$ considered:
    expand V, if needed, to enclose point $C[i]$
    If the user desires, the system can apply this automatically computed volume V when performing the mapping from real-world position to virtual world positions.

Operator Information Display:
Operator Guidance or Shooting Guides

Shooting guides enable a user to better see how the current camera image relates to past and upcoming shots so that he or she can more precisely match compositions (e.g. character eye-levels) between shots or manually create complex camera moves that require moving the camera precisely from one selected viewpoint to the next.

The user can opt to enable display or transparent or outline overlays or guidelines for any one or more previous or upcoming viewpoints (as per preceding section titled "Information of previous and upcoming viewpoints"). For example, if the user wishes to precisely match the eye level of characters in the current view to that of the previous viewpoint, the user can enable display of a transparent overlay of the last frame of the previous viewpoint. In this way the user can manually control the virtual camera to frame the eyes in the current shot so that they are at the same vertical level in the frame as they were in the previous shot. Alternately, the system can display an overlay as an outline form of the characters as they appeared in the previous shot or horizontal or vertical guidelines marking the locations and sizes of subjects in the previous shot. This information can be readily accessed from the visual composition encoding of the previous shot. Similarly, the user can select to enable overlays or guidelines for upcoming shots in the same fashion. If the user enables display of overlays for more than one prior or upcoming shot, the system can vary the color or degree of transparency to distinguish each overlay guide. The format of guidelines can be selected based on which visual composition properties were designated as being important for the current shot:
  height: display vertical lines below and above a subject
  width: display vertical lines to left and right of a subject
  location in frame: display a rectangle enclosing the location of a subject The algorithm to Compute Difference in the Composition of Two Indexed Viewpoints can be used to determine what composition elements differ between the current camera view and a given target viewpoint. Depending on the nature of the difference, the system produces directions as either text, digitized audio, or graphical arrows that suggest the type of camera movement or lens zoom.

Difference in subject size (camera position is near target position and current lens angle is larger than lens angle of target viewpoint): suggest lens zoom-in if current subject size is less than target subject size.

Difference in subject location—a) if the subject is currently left of its placement in the target viewpoint, then suggest a pan to the left to cause the subject to shift from left to right. b) if the subject is currently right of its placement in the target viewpoint, then suggest a pan to the right to cause the subject to shift from right to left. c) if the subject is currently below its placement in the target viewpoint, then suggest a pan to the left to cause the subject to shift from left to right.

Learning from the user's current choices to inform the next solving steps

The process relies on a reinforcement learning technique to update the probabilities in the transition matrices, using the cuts already performed by the user. Three distinct transition matrices are encoded depending on whether the transition is performed:

1. during the same action (matrix TA): the two consecutive shots are conveying the same action;
2. between related actions (matrix TR): the two consecutive shots are conveying two different actions, but the actions have a causal link (e.g. in case of dialog, the first action being "Syme speaks Smith" and the second one "Smith answers to Syme" for instance). A causal link is established when the two actions share the same key subjects;
3. between unrelated actions (matrix TU): the two consecutive shots are conveying two different actions, and there is no causal link between them.

These transition matrices actually define preferences in using some transitions between shots over others. The system learns the transition matrices from the user inputs, by analyzing the successive choices in shot types performed by the user based on viewpoints suggested by the system 10 or modified or directly created by the user. The learning process operates as follows. Each time the user selects a suggestion, modified or not, or a manually created viewpoint as the new shot, the relevant transition matrix Tk to consider is first determined by analyzing whether (1) the successive conveyed actions are the same, (2) the actions are different but are causally linked, or (3) the actions are different and they have no causal link. Then all the value of the row i of the corresponding transition matrix Tk (where i corresponds to the canonical angle and canonical distance of the previous shot), are updated to reflect the change in transition probabilities. The probabilities in the matrices influence the quality of a shot by ranking preferred cuts better (the quality of transition Qt(s) is expressed as a function of the matrix entries).

In an embodiment, the processing module 18 determines the viewpoints to be suggested to the user and/or the display organization of the suggested viewpoints as a function of the values of the relevant current transition matrix in the row i of the corresponding transition matrix Tk corresponding to the type of the previous viewpoint.

The invention can be applied to a wide variety of embodiments especially in the form of human input devices, motion sensors, computing devices, display devices, and mobile computing devices on which the invention may be used. The techniques described regarding the collaborative workflow between a human operator and an automated virtual cinematography module is applicable to any existing and future algorithms which are able to automatically produce virtual camera viewpoints and moves. Consequently, it should be understood that the exemplary embodiments described herein are intended to serve as examples to better explain the invention and should not be interpreted as limiting the scope of this invention.

In an embodiment, the invention is used to operate with captured-motion data from real-world movie sets. The system's maintains a mathematical model of the position, orientation, and lens properties of a camera and the objects in a given scene in addition to object geometry and pre-determined (or recorded) animated actions. In its current embodiment, an artist models props and characters and choreographs their movements to play out a pre-determined scene of a movie. Future developments in motion-sensing technology may one day make it possible to in-real time capture a mathematical model of the shapes and movements of real human actors playing out a scene in a movie, theatrical performance, ballet, or sporting event, etc. Once this next-generation motion and shape capture system has captured the scene, complex image processing methods compute a mathematical model of the real-world scene including any objects and their motions. This invention could then load this scene data and use it to render and replay a computer-generated animation of the captured real-world action. A filmmaker would then use this very same invention in its current embodiment to re-play (as many times as he wants) a computer-generated graphical visualization of the scene and its actions. The invention would propose suggested viewpoints for alternative ways to film the action and the user could move about his workspace using a motion sensor to manually adjust suggested viewpoints or create his own viewpoints to film the objects or actions in the digitized model of the scene.

In an embodiment, the invention generates sequences of viewpoints rather than only viewpoints. Actions in real movies, especially dialogues, are conveyed in typical ways using a sequence of shots (e.g. alternating between front and reverse shots). The system of the invention has the ability to compute and generate such sequences of shots attached to an action by integrating a pacing metric. The display of the shots, in the user interface, is then spatially organized in terms of number of shots necessary to cover the current action; and the rest of navigation between the viewpoints remains the same. This invention represents the first automated virtual cinematography system in which creative human judgments and machine computational power collaborate to more rapidly create works of cinematography for computer-generated animations.

The invention claimed is:

1. A computer-implemented method for computing and proposing one or more virtual camera viewpoints comprising the steps of:

computing virtual camera viewpoints of a given set of three-dimensional subjects corresponding to a common time point where said computation is a function of at least one visual composition property of at least one previously recorded virtual camera viewpoint, presenting said computed virtual camera viewpoints, detecting a selection of at least one of said presented virtual camera viewpoints, evaluating or ranking the quality of said candidate viewpoints as a function of at least one visual composition property of at least one previously recorded viewpoint, where ranking uses a function of the continuity with respect to at least one visual composition property of the image corresponding to a candidate viewpoint versus the image corresponding to at least one previously recorded virtual camera viewpoint, and recording of said selected virtual camera viewpoint.

2. The method of claim 1, comprising a step of using said recorded virtual camera viewpoint for a shot of images from said common time point.

3. The method of claim 1, where an image of animation is determined as a function of projecting onto a two-dimensional image, the geometric representation of said three-dimensional subject(s) as viewed from a given virtual camera viewpoint.

4. The method of claim 1, where a virtual camera viewpoint is described by any one or more of the following properties: position of a virtual camera relative to a coordinate system, the orientation of a virtual camera relative to a coordinate system, field of view angle of a virtual camera lens, or focal depth of a virtual camera lens.

5. The method of claim 1, where a visual composition property is determined as a function of at least one dimension of at least one of said subjects in the image.

6. The method of claim 1, where a visual composition property includes location of at least one of said subjects in the image.

7. The method of claim 1, where a visual composition property includes relative angle between the virtual camera and at least one of said subjects or direction of motion of at least one of the said subjects or direction in which the at least one of the subjects faces.

8. The method of claim 1, where a visual composition property includes on which side of the line of interest the virtual camera is positioned.

9. The method of claim 1, where a visual composition property includes the apparent overlapping or occlusion of the one subject over another subject.

10. The method of claim 1, comprising the detection of a selection by a user of one or more desired visual composition properties that are to be used in the step of ranking candidate viewpoints.

11. The method of claim 1, where the step of ranking candidate viewpoints according to continuity of at least one visual composition property comprises determining whether or not a candidate viewpoint maintains similar appearance of said property with respect to at least one previously recorded virtual camera viewpoint, and wherein maintaining a similar appearance corresponds to a higher quality of said candidate viewpoint.

12. The method of claim 11, where maintaining similar appearance comprises that the candidate viewpoint lies on the same side of the line of interest as said previously recorded viewpoint.

13. The method of claim 11, where maintaining similar appearance comprises that the candidate viewpoint's shot size is within one canonical unit of its shot size from said previously recorded viewpoint.

14. The method of claim 11, where maintaining similar appearance comprises that the difference in viewpoint orientation relative to at least one subject or direction of motion of at least one subject or direction in which the at least one subject faces in a candidate viewpoint versus said previously recorded viewpoint is less than a given threshold.

15. The method of claim 14, wherein the given threshold for the difference in orientation with relation to the subject is 30 degrees.

16. The method of claim 11, where maintaining similar appearance comprises that the distance between the center of a subject as seen in the image corresponding to a candidate viewpoint is less than a specified desired threshold versus the center of the same subject as seen in the image corresponding to said previously recorded viewpoint.

17. The method of claim 11, where maintaining similar appearance comprises at least one of the following conditions:
- that the center of an subject as seen in the image corresponding to a candidate viewpoint and the center of the same subject as seen in the image corresponding to said previously recorded viewpoint project to the same relative side of a specified line of reference;
- if an subject as seen in the image corresponding to a candidate viewpoint and the same subject as seen in the image corresponding to said previously recorded viewpoint are overlapped by the same other subject(s), and if the difference between said two images of the amount of overlapping is less than a given threshold;
- if the difference between the amount of occlusion of an subject as seen in the image corresponding to a candidate viewpoint and of the same subject as seen in the image corresponding to said previously recorded viewpoint of the amount is less than a given threshold;
- if an subject as seen in the image corresponding to a candidate viewpoint and the same subject as seen in the image corresponding to said previously recorded viewpoint are cropped or clipped by the same edge(s) of image;
- if both the distance between a virtual camera position corresponding to a candidate viewpoint and the center of an subject as seen in the image corresponding to a candidate viewpoint and the distance between a virtual camera position corresponding to a candidate viewpoint and the center of the same subject as seen in the image corresponding to said previously recorded viewpoint lie less than a given number of units of the distance of sharpest focus;
- if both the distance between a virtual camera position corresponding to a candidate viewpoint and the center of an subject as seen in the image corresponding to a candidate viewpoint and the distance between a virtual camera position corresponding to a candidate viewpoint and the center of the same subject as seen in the image corresponding to said previously recorded viewpoint lie more than a given number of units of the distance of sharpest focus;
- if the sum of visual weight of all subjects is concentrated in the same region of the image for both the image corresponding to a candidate viewpoint and the image corresponding to a candidate viewpoint.

18. The method of claim 1, where the step of ranking candidate viewpoints according to continuity of at least one visual composition property comprises determining whether or not a candidate viewpoint is distinct in appearance in terms of said property with respect to at least one previously recorded virtual camera viewpoint; and wherein being distinct in appearance corresponds to a higher quality of said candidate viewpoint.

19. The method of claim 18, where being distinct in appearance comprises that the candidate viewpoint's shot size differs by two or more canonical units from said previously recorded viewpoint.

20. The method of claim 18, where being distinct in appearance comprises that the difference in viewpoint orientation relative to at least one subject or direction of motion of at least one subject or direction in which the at least one subject faces in a candidate viewpoint versus said previously recorded viewpoint is more than a given threshold.

21. The method of claim 20, wherein said given threshold for the difference of orientation with relation to the subject is 30 degrees.

22. The method of claim 1, comprising a step of detecting the specification by a user of whether continuity of at least one visual composition property maintains similar appearance or is to be distinct in appearance with respect to at least one previously recorded virtual camera viewpoint.

23. The method of claim 1, where the step of ranking said candidate viewpoints uses a function of knowledge of previously observed transitions between two or more previously-recorded virtual camera viewpoints where said knowledge of previously observed transitions is organized according to at least one visual composition property.

24. The method of claim 23, where a previously recorded virtual camera viewpoint is a member of a canonical shot type.

25. The method of claim 24, where a canonical shot type includes one or more virtual camera viewpoints that share the same canonical angle as defined as being any one of internal, apex, external, parallel, subjective, front, left, and rear.

26. The method of claim 24, where a canonical shot type includes one or more virtual camera viewpoints that share the same canonical distance as defined as being any one of extreme close-up, close-up, medium, long, and extreme long.

27. The method of claim 24, where a canonical shot type is defined comprising a semantic volume that demarcates a region of space that may contain one or more virtual camera viewpoints.

28. The method of claim 23, where a count is maintained of the number of observed transitions between a specific preceding canonical shot type and a specific succeeding canonical shot type.

29. The method of claim 28, where the count is stored using a two-dimensional matrix having rows and columns corresponding to canonical shot types.

30. The method of claim 23, where the quality ranking for a candidate viewpoint in canonical shot type comprises assigning a rank proportionate to the count corresponding to the number of observed transitions from the canonical shot type of the previously recorded viewpoint to canonical shot type of the candidate viewpoint.

31. The method of claim 23, where the knowledge of observed transitions may distinguish between transitions that occur in contexts of at least any one or more of the same action being depicted in the two shots of a transition, related actions being depicted in the two shots of a transition, or unrelated actions being depicted in the two shots of a transition.

32. The method of claim 31, where a separate transition matrix is maintained for each of said contexts.

33. A non-transitory computer-readable storage medium having stored therein instructions capable of causing a computer to perform the method of claim 1.

34. A computer-implemented method for computing and proposing one or more virtual camera viewpoints comprising the steps of:

computing virtual camera viewpoints of a given set of three-dimensional subjects corresponding to a common time point where said computation is a function of at least one visual composition property of at least one previously recorded virtual camera viewpoint, presenting said computed virtual camera viewpoints, detecting a selection of at least one of said presented virtual camera viewpoints, and recording of said selected virtual camera viewpoint to some form of non-transitory computer-readable storage, and comprises the step of updating the function of knowledge of observed transitions between two successively selected virtual camera viewpoints as a function of the observed transition between the most recent previously-recorded virtual camera viewpoint and said currently selected and reviewed virtual camera viewpoint.

35. The method of claim 34, where recording comprises storing a record of said virtual camera viewpoint in the form of the virtual camera properties corresponding to said virtual camera viewpoint.

36. The method of claim 34, where recording comprises storing a representation of the image corresponding to said virtual camera viewpoint.

37. The method of claim 34, where a record is made of the observation of a transition in which the canonical shot type of said selected virtual camera viewpoint follows the canonical shot type of the previously recorded virtual camera viewpoint.

38. The method of claim 37, where the transition matrix element determined by the row and column corresponding to said pair of canonical shot types of said transition is updated to reflect an observed occurrence of said transition.

* * * * *